US007054593B2

(12) United States Patent
de La Chapelle et al.

(10) Patent No.: US 7,054,593 B2
(45) Date of Patent: May 30, 2006

(54) RETURN LINK DESIGN FOR PSD LIMITED MOBILE SATELLITE COMMUNICATION SYSTEMS

(75) Inventors: Michael de La Chapelle, Bellevue, WA (US); Kevin M. O'Brien, Los Alamitos, CA (US)

(73) Assignee: The Boeing Company, Chicago, IL (US)

( * ) Notice: Subject to any disclaimer, the term of this patent is extended or adjusted under 35 U.S.C. 154(b) by 678 days.

(21) Appl. No.: 09/884,555

(22) Filed: Jun. 19, 2001

(65) Prior Publication Data

US 2002/0058478 A1 May 16, 2002

Related U.S. Application Data

(63) Continuation-in-part of application No. 09/728,605, filed on Dec. 1, 2000, which is a continuation-in-part of application No. 09/672,378, filed on Sep. 20, 2000.

(51) Int. Cl.
*H04B 7/185* (2006.01)
(52) U.S. Cl. .................. 455/13.4; 455/12.1; 455/13.1; 455/13.2; 455/13.3; 455/431; 455/427
(58) Field of Classification Search ................ 455/12.4, 455/13.1–13.4, 12.1, 12.2, 12.3, 427–431
See application file for complete search history.

(56) References Cited

U.S. PATENT DOCUMENTS

| | | | |
|---|---|---|---|
| 3,972,045 A | 7/1976 | Perret | |
| 4,392,139 A | 7/1983 | Aoyama et al. | |

(Continued)

FOREIGN PATENT DOCUMENTS

EP    805568 A1    11/1997

(Continued)

OTHER PUBLICATIONS

Publication entitled "Field Experiment on Digital Maritime and Aeronautical Satellite Communication Systems Using ETS-V" by Y. Yasuda, M. Ohashi, F. Sugaya, M. Yasunaga and Y. Karasawa dated 1989.

(Continued)

*Primary Examiner*—Nay Maung
*Assistant Examiner*—Angelica M. Perez
(74) *Attorney, Agent, or Firm*—Harness Dickey & Pierce P.L.C.

(57) ABSTRACT

A system and method for managing access to a satellite-based transponder by a plurality of aircraft each having a mobile radio frequency (RF) system. The system employs a ground-based, central control system for managing access to the satellite-based transponder so that the aggregate power spectral density (PSD) of the RF signals of all the mobile systems does not exceed, at any time, limits established by regulatory agencies to prevent interference between satellite systems. This is accomplished by a dual control loop arrangement for monitoring the signal-to-noise ratio (Eb/No) of the RF signal transmitted by the satellite-based transponder. A ground-based control loop is used whereby a ground-based central controller monitors the Eb/No and transmits commands to the aircraft (via the satellite transponder) to maintain the Eb/No of the transmitted signal within a predetermined range. A fast scan angle compensation is used by the mobile system of the aircraft to implement another control loop to further adjust the transmit power. This control loop maintains the Eb/No of the signal transmitted to the satellite-based transponder at the commanded level inbetween updates from the ground-based central controller.

11 Claims, 13 Drawing Sheets

U.S. PATENT DOCUMENTS

| | | |
|---|---|---|
| 4,654,484 A | 3/1987 | Reiffel et al. |
| 4,743,906 A | 5/1988 | Fullerton |
| 4,866,515 A | 9/1989 | Tagawa et al. |
| 4,901,307 A | 2/1990 | Gilhousen et al. |
| 4,941,199 A | 7/1990 | Saam |
| 4,958,381 A | 9/1990 | Toyoshima |
| 5,027,124 A | 6/1991 | Fitzsimmons et al. |
| 5,127,021 A | 6/1992 | Schreiber |
| 5,146,234 A | 9/1992 | Lalezari |
| 5,230,076 A | 7/1993 | Wilkinson |
| 5,249,303 A | 9/1993 | Goeken |
| 5,285,470 A | 2/1994 | Schreiber |
| 5,289,272 A | 2/1994 | Rabowsky et al. |
| 5,311,302 A | 5/1994 | Berry et al. |
| 5,313,457 A | 5/1994 | Hostetter et al. |
| 5,463,656 A | 10/1995 | Polivka et al. |
| 5,495,258 A | 2/1996 | Muhlhauser et al. |
| 5,524,272 A | 6/1996 | Podowski et al. |
| 5,555,466 A | 9/1996 | Scribner et al. |
| 5,568,484 A | 10/1996 | Margis |
| 5,583,735 A | 12/1996 | Pease et al. |
| 5,760,819 A | 6/1998 | Sklar et al. |
| 5,790,175 A | 8/1998 | Sklar et al. |
| 5,801,751 A | 9/1998 | Sklar et al. |
| 5,867,765 A | 2/1999 | Nilsson |
| 5,884,164 A | 3/1999 | Gerard et al. |
| 5,956,619 A * | 9/1999 | Gallagher et al. ......... 455/12.1 |
| 5,990,928 A | 11/1999 | Sklar et al. |
| 6,005,513 A | 12/1999 | Hardesty |
| 6,014,606 A | 1/2000 | Tu |
| 6,034,634 A | 3/2000 | Karrisson et al. |
| 6,047,165 A | 4/2000 | Wright et al. |
| 6,104,914 A | 8/2000 | Wright et al. |
| 6,108,523 A | 8/2000 | Wright et al. |
| 6,256,496 B1 * | 7/2001 | Dintelmann et al. ......... 455/427 |
| 6,606,307 B1 * | 8/2003 | Chang et al. ............... 370/316 |

FOREIGN PATENT DOCUMENTS

| | | |
|---|---|---|
| EP | 820159 A2 | 1/1998 |
| WO | WO 00/14987 | 3/2000 |

OTHER PUBLICATIONS

Publication "ARINC wins support for AvSat program" by Bron Rek dated May 1987.

Publication "Applied Superconductivity" by Roger B. Poeppel, vol. 1, Numer 7-9, Jul.-Sep., 1993.

"Spread-spectrum signals used in global satellite navigation" by P. Daly, S.A. Dale, I.D. Kitching and G.R. Lennen.

"Airborne array antennas for satellite communication" by M. Yasunaga, F. Watanabe and T. Shiokawa.

"Airborne Phased Array Antenna for Mobile Satellite Communicaitons" by T. Teshirogi, M. Tanaka and S. Ohmori.

Correspondence entitled "Propagation Results of Aeronautical Satellite Communication Experiments using INMARSAT Satellite"; vol. 28, No. 4, Oct. 1992.

"Aircraft Earth Station For Experimental Mobile Satellite System" by S. Ohmori, Y. Hase, K. Kosaka and M. Tanaka.

FCC application dated Feb. 16, 1987.

* cited by examiner

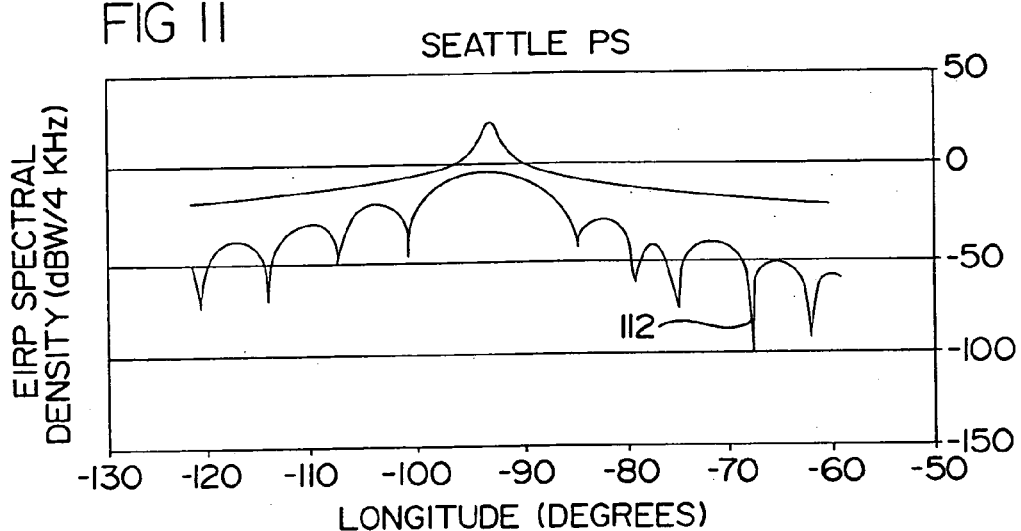
FIG 11 — 256 ELEMENT PHASED ARRAY ANTENNA, 34 dBW, 64 Kbps, SEATTLE
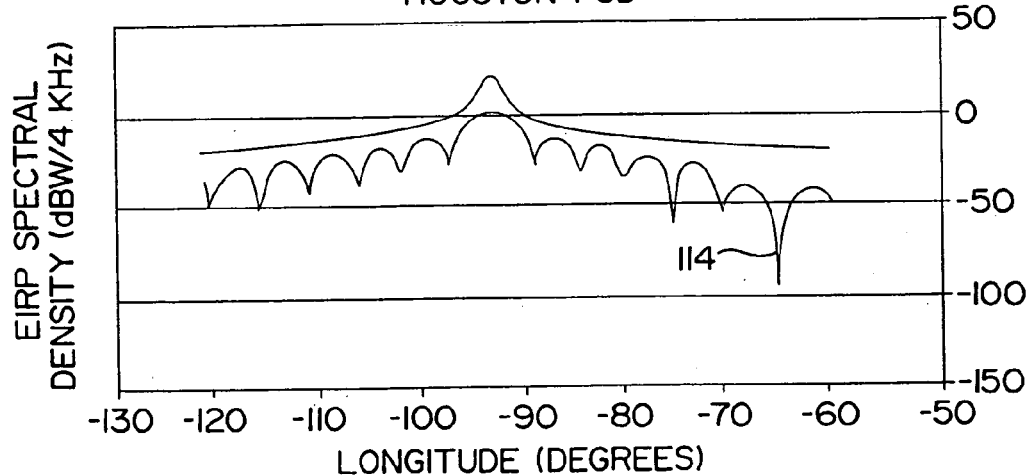
FIG 12 — 512 ELEMENT PHASED ARRAY ANTENNA, 39 dBW, 256 Kbps, HOUSTON

RETURN LINK DESIGN FOR PSD LIMITED MOBILE SATELLITE COMMUNICATION SYSTEMS

CROSS REFERENCE TO RELATED APPLICATIONS

This application is a continuation-in-part of U.S. Ser. No. 09/728,605, filed Dec. 1, 2000, presently pending, which is a continuation-in-part of U.S. Ser. No. 09/672,378, filed Sep. 20, 2000, presently pending.

TECHNICAL FIELD

In the interval between power control commands, a second control loop is employed by the mobile terminal to maintain the transmit EIRP at the commanded level. The second closed control loop is required for stabilizing the transmit EIRP during rapid movement and/or attitude changes of the mobile platform. The second closed control loop thus reduces the power control errors caused by the round trip delay between the ground-based central controller and the mobile terminal, which is approximately 0.5 seconds, round trip.

BACKGROUND OF THE INVENTION

Broadband data and video services, on which our society and economy have grown to depend, have heretofore generally not been readily available to users on board mobile platforms such as aircraft, ships, trains, automobiles, etc. While the technology exists to deliver such services to all forms of mobile platforms, past solutions have been generally quite expensive, low data rate and/or available to only very limited markets of government/military users and some high-end maritime markets (i.e., cruise ships).

At present, a wide variety of broadcast television (TV) services are available to terrestrial users via satellite links. Such services include commercial Direct Broadcast Satellite (DBS) services (such as DirecTV and EchoStar) and custom video, such as rebroadcast video, over private Fixed Satellite Services (FSS) or Broadcast Satellite Services (BSS) satellites. The data services which can be provided via satellite link include all conventional Internet services (e.g., email, web browsing, NetMeeting, etc.), as well as virtual private networks (VPNs) for corporate and government customers.

Previously developed systems which have attempted to provide live TV and data services to mobile platforms have done so with only limited success. One major obstacle has been the high cost of access to such broadband data and video services. Another problem is the limited capacity of previously developed systems, which is insufficient for mobile platforms carrying dozens, or even hundreds, of individuals who each may be simultaneously requesting different channels of programming or different data services. Furthermore, presently existing systems are generally not readily scalable to address the demands of the traveling public.

Certain services currently available provide a limited subset of the above described services. One such service provides a narrow-bandwidth Internet connection to users on a mobile platform. Another service provides either TV broadcast services from available direct broadcast signals (i.e., EchoStar and DirecTV) or provides a custom TV broadcast signal through dedicated satellite links (i.e., Airshow). However, no system or method presently exists for providing high speed (i.e., greater than 64 Kbps) data networking services to groups of users on mobile or remote platforms, let alone for providing such high-speed networking services together with video services.

There are several operational systems that provide limited Internet data services on commercial airlines and cruise ships. These systems are very limited in their link capability (primarily use communication links developed for telephony) and the service is very expensive (greater than about $1.00 per minute for voice connection). For these reasons, and in view of adherent limitations on the capacity of such systems, such systems have met with limited commercial success and acceptance.

Current operational systems generally use Inmarsat satellite communication links or terrestrial wireless communication links (i.e., the National Air Telephone System "NATS") to achieve 2-way connectivity to mobile platforms. These connection forms have several drawbacks:

1) a limited connection bandwidth (typically less than 64 Kbps);
2) limited overall system capacity (due to limited frequency spectrum); and
3) high expense.

Inmarsat operates in the L-band frequency spectrum, where there is very little bandwidth and capacity available for providing broadband services to the traveling public. NATS based solutions (i.e., GTE Airfone, AT&T Claircom), familiar to domestic airline travelers who use seat back-mounted telephones, also provide very limited capacity because of operation at L-band. These systems also suffer from the additional problem that connectivity is only available over land.

Current mobile platform connection methods are inherently narrow band and restrict the flow of data to the point where common networking tasks are impossible. Typically, this connectivity is achieved through the use of a standard computer telephone modem between the user's computer and the air-ground or ship-shore telephony system. In this scenario, each user gets exclusive use of a full communications channel for the duration of his/her networking session and effectively prevents others from using that portion of the telephony system.

With present day systems which attempt to provide a means by which a plurality of mobile platforms transmit data to a shared satellite-based transponder, a particularly troubling problem has been how to efficiently operate and manage a plurality of small aperture mobile transmitting terminals that are geographically distributed over a wide area, with each mobile terminal transmitting at a different power spectral density (PSD) level according to its specific aperture size, the location of the mobile platform and the data rate at which data is being transmitted. It will be appreciated that airborne antennas such as electronically scanned phased array antennas (PAAs) tend to be smaller in aperture size than conventional terrestrial antenna. This is because of the important requirement for low aerodynamic drag of the antenna. Therefore, mobile platform based transmit antennas tend to have wider antenna beams than conventional terrestrial Very Small Aperture (VSAT) antennas (typically about one meter diameter aperture). As a result, they radiate more power to adjacent satellites along the geostationary orbit (GSO) plane. Also, mobile transmit antennas can interfere with communications on satellites in non-geostationary orbits (NGSOs). Put differently, such mobile transmit antennas can easily produce signals that interfere with the operation of GSO and NGSO satellites that are adjacent to the target satellite.

There are strict regulatory requirements imposed by regulatory agencies such as the Federal Communications Commission (FCC) and International Telecommunications Union (ITU) on the maximum power spectral density (PSD) that can be radiated to adjacent GSO and NGSO satellites. When a plurality of mobile platforms are transmitting RF signals to a common transponder within a given coverage region, it becomes very difficult to manage the PSD of individual mobile platforms to ensure that the "aggregate" PSD never exceeds the regulatory limits, while simultaneously attempting to maximize the total number of mobile platforms accessing the transponder.

One previously developed approach for dealing with the above-described problem of managing the transmissions of a plurality of transmitters accessing a single transponder has been to employ multi-channel-per-carrier (MCPC) operation. With this method, which was developed by Intelsat, each VSAT antenna is allocated a portion of the satellite transponder bandwidth. In other words, this method uses frequency division multiple access (FDMA) to allow multiple terminals to simultaneously access the transponder. Using this technique, only one terminal (carrier) is transmitting in each channel at a PSD below the regulatory limit. This method of operation is wasteful of PSD because the unused PSD in each channel cannot be used. Furthermore, MCPC cannot be adapted to efficient PSD operation because channel management becomes prohibitively complex, especially for applications using mobile terminals. This invention provides a simple link management solution for mobile platforms having time varying PSDs. Similarly, time division multiple access (TDMA) methods have only one terminal accessing a channel or time slot at any time so that the available channel PSD is fixed and usually exceeds the requirements of the channel user. Therefore, PSD is wasted and cannot be reused. With these previously developed methods, individual accesses do not usually occur at the maximum allowable PSD, so that there will usually be some amount of PSD that is unused or wasted in every channel. This is the primary drawback of all previously developed methods.

The above described scenarios where only one terminal is transmitting within a channel or time slot at any given time thus present the classic problem of allocating a fixed size resource (i.e., PSD) to variable sized users. The fixed size resource must then be sized for the worst case (i.e., maximum PSD) user so there will always be inefficiency with these approaches. If the variations between users is small, then the inefficiency can be reasonably low, but for any other application where there are large differences in user PSD requirements, the inefficiency becomes substantial.

Still another prior developed method of dealing with multiple terminals accessing a single transponder is code division multiple access (CDMA), whereby a single channel is shared by multiple users. More efficient operation can be achieved with CDMA because large pools of users share a common resource (i.e., the transponder). Most CDMA systems operate without restriction on aggregate PSD (such as cell phone systems, for example). Typically, user terminals or handsets transmit with a power level required to overcome interference, without any regulatory restrictions on aggregate PSD. With this method of operation there are statistical variations in PSD levels and interference between users that would be unacceptable for high-quality satellite data communication systems. In contrast, satellite based communication systems often must operate within strict regulatory limits on aggregate PSD. This is especially critical in the Fixed Satellite Services (FSS) portion of the Ku-band, where Mobile Satellite Services (MSS) have been given a secondary frequency allocation by the ITU, and must guarantee non-interference with primary FSS systems. Thus, managing CDMA satellite systems in a PSD limited environment requires new methods for managing the aggregate PSD produced by all of the user terminals, especially when the terminals are to be disposed on mobile platforms such as aircraft.

It is therefore a principal object of the present invention to provide a system and method for managing the aggregate PSD produced by a plurality of mobile terminals operating within a given coverage region, and accessing a shared satellite-based transponder, such that the aggregate PSD does not exceed regulatory PSD limits for interference with GSO and NGSO satellites.

It is still another object of the present invention to provide a system and method for using a central control system to monitor the PSD of each one of a plurality of mobile terminals operating within a given coverage region and accessing a shared satellite-based transponder, and to ensure that the aggregate PSD of the RF signals to be transmitted by the mobile terminals does not exceed a predetermined regulatory PSD limit and which is used to authorize RF transmissions by each of the mobile terminals.

It is still a further object of the present invention to provide an apparatus and method for monitoring and authorizing transmissions from a plurality of mobile terminals which each produce RF signals having differing PSDs, and which operates to manage access to a satellite-based transponder by the mobile terminals such that the aggregate PSD of the transmissions from all of the mobile terminals does not exceed a predetermined regulatory PSD limit. It is a further object of this method to provide a control system that will deny access to the satellite-based transponder if such access would cause the aggregate PSD to exceed the predetermined regulatory PSD limit, and to permit access to the transponder if the aggregate PSD is below the regulatory limit.

SUMMARY OF THE INVENTION

The above and other objects are provided by a method and apparatus for providing television and data services to mobile platforms. More particularly, the invention relates to a method and apparatus for managing the aggregate PSD of a plurality of mobile terminals operating within a given coverage region and accessing a shared satellite-based transponder, such that the aggregate PSD does not exceed predetermined regulatory PSD limits for GSO and NGSO interference. In one preferred embodiment, the system of the present invention makes use of a ground-based segment having a central controller.

Each mobile terminal sends a "request-for-authorization-to-transmit" signal to the satellite-based transponder, which is then relayed by the transponder to the ground station, which receives the request and forwards it to the central controller. This signal includes a variety of information which enables the central controller to determine the PSD of the RF signal which will be transmitted by the particular mobile terminal if authorization to transmit is given. This information typically includes the location of the mobile terminal (i.e., the location in terms of latitude and longitude of the mobile platform associated with the mobile terminal), the location of the satellite-based transponder to which it is transmitting, the type and design of transmit antenna being used on the mobile terminal, the transmit power ($P_t$) of the mobile terminal, and the pointing coordinates for the mobile transmit antenna (i.e. azimuth and elevation angles). Optionally the mobile platform heading, pitch and roll angles may be sent instead of the antenna coordinates. The central controller uses the above information to determine the PSD of the RF signal to be transmitted by the mobile terminal and adds it to the aggregate PSD of the other mobile platforms sharing the transponder channel. The central controller then compares the new aggregate PSD to a predetermined regulatory PSD limit to ensure that the PSD limit will not be exceeded if the mobile terminal is allowed to transmit. If the PSD limit will not be exceeded, then the central controller sends an "authorization-to-transmit" signal via the satellite-based transponder to the mobile terminal authorizing the RF transmission by the mobile terminal.

Every mobile terminal operating within the coverage region sends a request-to-transmit signal to the central controller via the satellite-based transponder. The central controller determines the PSD of each mobile terminal and sums the PSDs together to produce the aggregate PSD. Only if the aggregate PSD is below the regulatory PSD limit does the central controller then authorize a particular mobile terminal to transmit. If the PSD of any subsequent mobile terminal requesting authorization to transmit is determined by the central controller to produce an aggregate PSD that would exceed the predetermined regulatory PSD limit, then the central controller will deny authorization to transmit to the mobile terminal making the request. In this manner a plurality of mobile terminals are allowed to access the satellite-based transponder provided the aggregate PSD of the RF transmissions from each mobile platform do not exceed the predetermined regulatory PSD limit. In this manner, the efficiency of the system is also maximized by operating near the regulatory PSD limit (with appropriate margins for errors in estimating PSD). Making full use of the capacity of expensive satellite transponders is necessary for reducing system operating costs and maximizing profitability.

To accomplish the above-described operation, the RF transmit signal from each mobile terminal is spread in frequency to reduce the PSD at any given frequency. In the preferred embodiment, the PSD of each mobile terminal is spread over the entire bandwidth, B, of the satellite transponder. Multiple mobile terminals simultaneously share access to the return link transponder using this method. Typically, tens or even hundreds of mobile terminals may simultaneously share a transponder while the central controller maintains the aggregate PSD below the regulatory limits.

In an alternative implementation, the PSD of each mobile terminal is spread over a predetermined frequency channel within the transponder bandwidth such that the transponder bandwidth is divided into a plurality of N frequency channels and the channel bandwidth is B/N (where "B" represents the full transponder bandwidth). Each mobile terminal is assigned to a particular channel and spreads its signal over the full channel bandwidth. Multiple mobile terminals are assigned to operate in each channel while the central control system maintains the aggregate PSD in each channel below the regulatory limits.

In both of the above embodiments of the invention, a means of spreading the transmit signal in frequency is required. While a number of different commonly used spreading methods may be used with this invention, the preferred spreading method is direct sequence spread spectrum, which employs a pseudo noise (PN) code to disperse the signal energy over a predetermined frequency band. Multiple mobile terminals can simultaneously access a single transponder or transponder channel by using different PN spreading codes. After the signals from the mobile terminals are received by the satellite transponder and re-transmitted to the ground, a receiver in the ground station separates the signals from each mobile terminal by using a filter that is matched to the particular PN code assigned to each mobile terminal. Interference between multiple mobile terminals can be minimized by time synchronizing the PN code transmissions from multiple mobile terminals, but in practice this is difficult to accomplish with mobile terminals, so the preferred embodiment uses asynchronous code transmissions.

A key feature of the invention is that it provides demand assigned multiple access to mobile terminals. Mobile terminals request and release data rate according to instantaneous demand for data rate by users on the mobile terminals. The transmit power required by the mobile terminal to transmit to the satellite and back to the ground station is proportional to data rate. So the central controller processes requests for different data rates from the mobile terminals as changes in transmit power, and hence PSD. Thus, requests for increased data rate are effectively requests for more PSD, and the central controller must evaluate whether the aggregate PSD is less than the PSD regulatory limit before the request is granted, in the manner previously described. Alternatively, if the mobile terminal is releasing unused data rate, then the PSD contribution is subtracted from the aggregate so that this PSD may be made available to other mobile terminals sharing the transponder or channel.

The NOC periodically polls all inactive airborne terminals using the forward link. The polling message specifies a return link transponder for which the NOC has reserved sufficient capacity, in terms of GSO arc EIRP spectral density, to allow airborne terminal transmissions. When an airborne terminal receives its polling message, it transmits a response to the NOC over the assigned return link transponder, and the NOC assigns the airborne terminal "active" status.

The preferred implementations of the present invention further make use of a dual, closed-loop power control method by which the central controller communicates with each of the mobile terminals within the coverage region, in accordance with a first closed control loop, and instructs each of the mobile terminals by transmitting commands thereto to increase or decrease its transmit EIRP as needed, based upon a receive signal-to-noise ratio ("Eb/No") of the monitored signal, to maintain communication link closure. With this method, the ground station measures the Eb/No of the received RF signals and periodically sends commands back to the mobile terminals to increase or decrease the transmit power of each such mobile terminal to maintain the Eb/No within a desired control range.

In the interval between power control commands, a second control loop is employed by the mobile terminal to maintain the transmit EIRP at the commanded level The second closed control loop is required for stabilizing the transmit EIRP during rapid movement and/or attitude changes of the mobile platform. The second closed control loop thus reduces the power control errors caused by the round trip delay between the ground-based central controller and the mobile terminal, which is approximately 0.5 seconds, round trip.

In an alternative open-loop power control implementation, each mobile terminal determines its position on the Earth and its attitude. It is also provided with stored information concerning the location of the satellite-based transponder with which it will be communicating. From this information the mobile terminal estimates return link losses which will occur during transmission of its RF signals to the satellite and adjusts it's transmit power accordingly. With this method, the mobile terminal must periodically inform the central controller of it transmit power, position and attitude so that it's PSD contribution can be monitored.

In a preferred embodiment the present invention also makes use of a "reverse calculation" method for more accurately determining the PSD contribution of each mobile terminal. The "reverse calculation" method is a much more accurate method of determining aircraft PSD than "forward calculating" mobile terminal PSD by using an estimate of transmit EIRP made by the mobile terminal. In practice, it is both difficult and expensive for the mobile terminal to accurately estimate transmit EIRP. So the invention uses a novel method of "reverse calculating" mobile terminal EIRP by knowing the receive Eb/No at the ground station and working backwards through the link to determine the corresponding transmit EIRP of the mobile terminal. Once the transmit EIRP is determined, the PSD along the GEO plane and off of the GEO orbit plane can be determined in the manner described below.

In the preferred embodiment of the invention, the return link between the mobile terminal and the ground station is limited in performance by the portion of the link between the aircraft and the satellite. The portion of the return link between the satellite and the ground does not degrade the performance of the return link in the preferred embodiment. In practice this is accomplished by selection of a ground station antenna with sufficiently high gain over noise temperature (G/T). Under these conditions, the receive Eb/No at the ground station is equal to the receive Eb/No at the satellite and the equation for reverse calculating the EIRP of the mobile terminal is substantially simplified making possible the use of this method in practical systems.

Once the EIRP of the mobile terminal has been determined by the NOC using the reverse calculation method, the next step is to calculate the PSD contribution of the mobile terminal. To accomplish this, the NOC requires knowledge of the location and attitude of the mobile terminals. The mobile terminals are therefore required to periodically report these parameters to the NOC on the forward link. Each time a position/attitude report is received at the NOC, the PSD contribution from that mobile terminal is recalculated, and it's PSD contribution is added to the aggregate. The method of calculating mobile terminal PSD involves projecting the EIRP on to the GEO plane using an accurate antenna gain model and knowing the geometry defined by the reported location & attitude of the mobile terminal, and the known location of the satellite.

A preferred system for implementing power control over the return link signal from the mobile terminal is also disclosed. This system makes use of a scan angle compensator for determining the compensation signal to be applied to the transmit antenna of the mobile terminal to account for power variations in the signal transmitted by the mobile terminal as the attitude of the mobile platform carrying the mobile terminal changes. A separate control loop incorporating a ground controller and a reporting algorithm is used to examine power variations received at a ground or base station from a satellite-based transponder and to provide power correction commands back to the mobile platform which more precisely control the power level of the signal transmitted by the mobile terminal. The scan angle compensator essentially forms an open loop control circuit which functions in connection with pre-stored information relating to the effects of attitude changes of the mobile platform on the power level of the signal transmitted from the mobile platform's mobile terminal. The scan angle compensator is able to analyze scan angle measurements, or to infer the needed scan angle measurement information from attitude information supplied by, for example, an inertial reference unit (IRU) of the mobile platform, and to quickly determine needed changes in the power level of the signal being transmitted from the mobile terminal to prevent interference with satellites other than the target satellite.

The ground loop controller portion of the system operates to examine the Eb/No of the signal received by the satellite-based transponder and to determine appropriate power level correction commands that need to be applied to the signal by the mobile terminal to prevent interference with satellites in the vicinity of the target satellite. The ground loop controller transmits power level correction commands to the mobile terminal via the satellite-based transponder which serve to inform the mobile terminal as to the needed degree of power level correction. Advantageously, since the power level correction commands represent merely a value indicating the incremental change that is needed in the power level of the transmitted signal and since they are only transmitted when the ground loop controller determines that a meaningful correction can be applied, these commands require less bandwidth to transmit than would a signal relating to a specific power level that is transmitted at regular intervals regardless of the power level correction it would effect. The scan angle compensator and the ground loop controller thus provide two independent control loops for more accurately controlling the power level of the signal transmitted from the mobile terminal.

BRIEF DESCRIPTION OF THE DRAWINGS

The various advantages of the present invention will become apparent to one skilled in the art by reading the following specification and subjoined claims and by referencing the following drawings in which:

FIGS. 11–13 are graphs of the PSD along the GEO arc of the RF signals transmitted by each of the three aircraft shown in FIG. 10;

DETAILED DESCRIPTION OF THE PREFERRED EMBODIMENTS

Figure 1:
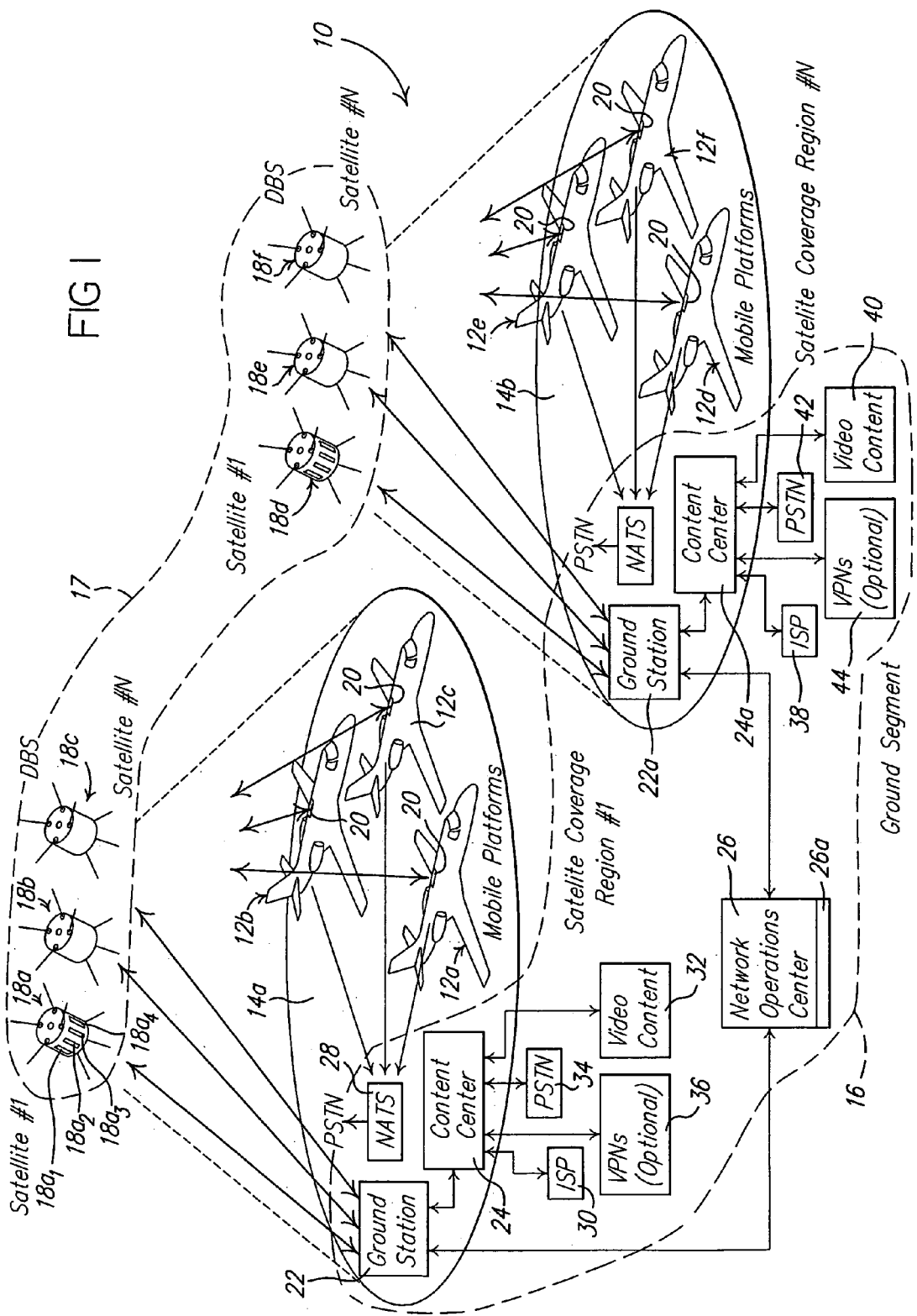
FIG. 1 is a simplified block diagram drawing illustrating the three major components of the system of the present invention.

Referring to FIG. 1, there is shown a system 10 in accordance with a preferred embodiment of the present invention for providing data content to and from a plurality of moving platforms 12a–12f in one or more distinct coverage regions 14a and 14b. The system 10 generally comprises a ground segment 16, a plurality of satellites 18a–18f forming a space segment 17, and a mobile system 20 disposed on each moving platform 12. The moving platforms could comprise aircraft, cruise ships or any other moving vehicle. Thus, the illustration of the moving platforms 12 as aircraft in the figures herein and the reference to the mobile platforms as aircraft throughout the following description should be understood as exemplary only, and not be construed as limiting the applicability of the system 10 to only aircraft.

The space segment 17 may include any number of satellites 18 in each coverage region 14a and 14b needed to provide coverage for each region. Satellites 18a, 18b, 18d and 18e are preferably Ku or Ka-band satellites. Satellites 18c and 18f are Broadcast Satellite Services (BSS) satellites. Each of the satellites 18 are further located in a geostationary orbit (GSO) or a non-geostationary orbit (NGSO). Examples of possible NGSO orbits that could be used with this invention include low Earth orbit (LEO), medium Earth orbit (MEO) and highly elliptical orbit (HEO). Each of the satellites 18 includes at least one radio frequency (RF) transponder, and more preferably a plurality of RF transponders. For example satellite 18a is illustrated having four transponders $18a_1$–$18a_4$. It will be appreciated that each other satellite 18 illustrated could have a greater or lesser plurality of RF transponders as required to handle the anticipated number of aircraft 12 operating in the coverage area. The transponders provide "bent-pipe" communications between the aircraft 12 and the ground segment 16. The frequency bands used for these communication links could comprise any radio frequency band from approximately 10 MHz to 100 GHz. The transponders preferably comprise Ku-band transponders in the frequency band designated by the Federal Communications Commission (FCC) and the International Telecommunications Union (ITU) for fixed satellite services FSS or BSS satellites. Also, different types of transponders may be employed (i.e., each satellite 18 need not include a plurality of identical types of transponders) and each transponder may operate at a different frequency. Each of the transponders $18a_1$–$18a_4$ further include wide geographic coverage, high effective isotropic radiated power (EIRP) and high gain/noise temperature (G/T).

With further reference to FIG. 1, the ground segment 16 includes a ground station 22 in bidirectional communication with a content center 24 and a network operations center (NOC) 26. A second ground station 22a located in the second coverage area 14b may be used if more than one distinct coverage area is required for the service. In this instance, ground station 22a would also be in bidirectional communication with the NOC 26 via a terrestrial ground link or any other suitable means for establishing a communication link with the NOC 26. The ground station 22a would also be in bi-directional communication with a content center 24a. For the purpose of discussion, the system 10 will be described with respect to the operations occurring in coverage region 14a. However, it will be understood that identical operations relative to the satellites 18d–18f occur in coverage region 14b. It will also be understood that the invention may be scaled to any number of coverage regions 14 in the manner just described.

The ground station 22 comprises an antenna and associated antenna control electronics needed for transmitting data content to the satellites 18a and 18b. The antenna of the ground station 22 may also be used to receive data content transponded by the transponders $18a_1$–$18a_4$ originating from the mobile system 20 of each aircraft 12 within the coverage region 14a. The ground station 22 may be located anywhere within the coverage region 14a. Similarly, ground station 22a, if incorporated, can be located anywhere within the second coverage area 14b.

The content center 24 is in communication with a variety of external data content providers and controls the transmission of video and data information received by it to the ground station 22. Preferably, the content center 24 is in contact with an Internet service provider (ISP) 30, a video content source 32 and a public switched telephone network (PSTN) 34. Optionally, the content center 24 can also communicate with one or more virtual private networks (VPNs) 36. The ISP 30 provides Internet access to each of the occupants of each aircraft 12. The video content source 32 provides live television programming, for example, Cable News Network (CNN®) and ESPN®. The NOC 24 performs traditional network management, user authentication, accounting, customer service and billing tasks. The content center 24a associated with the ground station 22a in the second coverage region 14b would also preferably be in communication with an ISP 38, a video content provider 40, a PSTN 42, and optionally a VPN 44. An optional air telephone system 28 may also be included as an alternative to the satellite return link.

Figure 2:
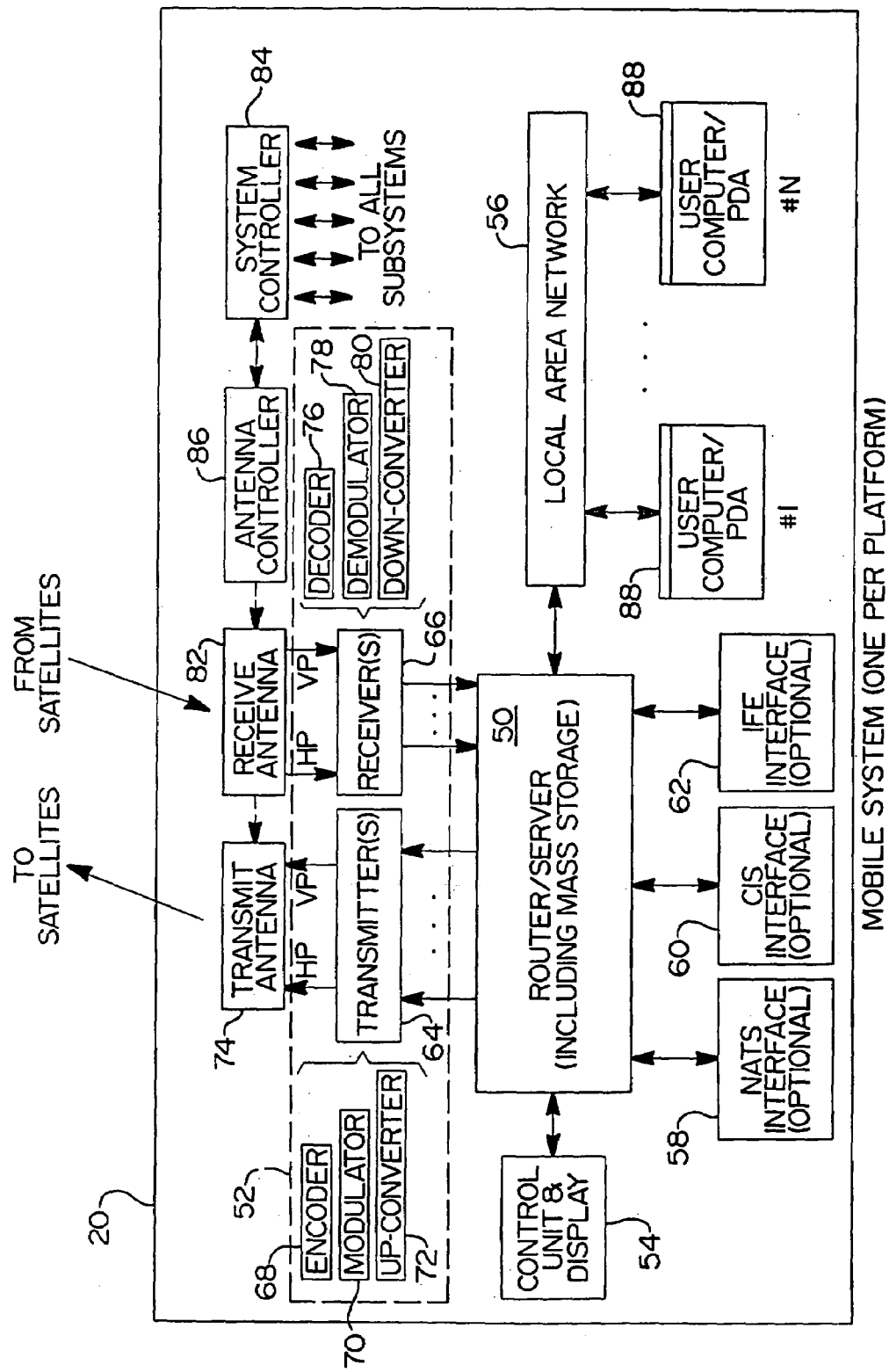
FIG. 2 is a block diagram of the mobile system carried on each mobile platform.

Referring now to FIG. 2, the mobile system 20 disposed on each aircraft 12 will be described in greater detail. For convenience, specific reference to aircraft 12a will be made, where appropriate, to assist in describing the components and/or operation of the system 10. Each mobile system 20 includes a data content management system in the form of a router/server 50 (hereinafter "server") which is in communication with a communications subsystem 52, a control unit and display system 54, and a distribution system in the form of a local area network (LAN) 56. Optionally, the server 50 can also be configured for operation in connection with a National Air Telephone System (NATS) 58, a crew information services system 60 and/or an in-flight entertainment system (IFE) 62.

The communications subsystem 52 includes a transmitter subsystem 64 and a receiver subsystem 66. The transmitter subsystem 64 includes an encoder 68, a modulator 70 and an Up-converter 72 for encoding, modulating and up-converting data content signals from the server 50 to a transmit antenna 74. The receiver subsystem 66 includes a decoder 76, a demodulator 78 and a down-converter 80 for decoding, demodulating and down-converting signals received by a receive antenna 82 into baseband video and audio signals, as well as data signals. While only one receiver subsystem 66 is shown, it will be appreciated that preferably a plurality of receiver subsystems 66 will typically be included to enable simultaneous reception of RF signals from a plurality of RF transponders. If a plurality of receiver subsystems 66 are shown, then a corresponding plurality of components 76–80 will also be required.

The signals received by the receiver subsystem 66 are then input to the server 50. A system controller 84 is used to control all subsystems of the mobile system 20. The system controller 84, in particular, provides signals to an antenna controller 86 which is used to electronically steer the receive antenna 82 to maintain the receive antenna pointed at a particular one of the satellites 18, which will hereinafter be referred to as the "target" satellite. The transmit antenna 74 is slaved to the receive antenna 82 such that it also tracks the target satellite 18. It will be appreciated that some types of mobile antennas may transmit and receive from the same aperture. In this case the transmit antenna 74 and the receive antenna 82 are combined into a single antenna.

With further reference to FIG. 2, the local area network (LAN) 56 is used to interface the server 50 to a plurality of access stations 88 associated with each seat location on board the aircraft 12*a*. Each access station 88 can be used to interface the server 50 directly with a user's laptop computer, personal digital assistant (PDA) or other personal computing device of the user. The access stations 88 could also each comprise a seat back mounted computer/display. The LAN 56 enables bidirectional communication of data between the user's computing device and the server 50 such that each user is able to request a desired channel of television programming, access a desired website, access his/her email, or perform a wide variety of other tasks independently of the other users on board the aircraft 12*a*.

The receive and transmit antennas 82 and 74, respectively, may comprise any form of steerable antenna. In one preferred form, these antennas comprise electronically scanned, phased array antennas. Phased array antennas are especially well suited for aviation applications where aerodynamic drag is important considerations. One particular form of electronically scanned, phased array antenna suitable for use with the present invention is disclosed in U.S. Pat. No. 5,886,671, assigned to The Boeing Co.

Referring further to FIG. 1, in operation of the system 10, the data content is preferably formatted into Internet protocol (IP) packets before being transmitted by either the ground station 22, or from the transmit antenna 74 of each mobile system 20. For the purpose of discussion, a transmission of data content in the form of IP packets from the ground station 22 will be referred to as a "forward link" transmission. IP packet multiplexing is also preferably employed such that data content can be provided simultaneously to each of the aircraft 12 operating within the coverage region 14*a* using unicast, multicast and broadcast transmissions.

The IP data content packets received by each of the transponders $18a_1$–$18a_4$ are then transponded by the transponders to each aircraft 12 operating within the coverage region 14*a*. While multiple satellites 18 are illustrated over coverage region 14*a*, it will be appreciated that at the present time, a single satellite is capable of providing coverage to an area encompassing the entire continental United States. Thus, depending upon the geographic size of the coverage region and the mobile platform traffic anticipated within the region, it is possible that only a single satellite incorporating a single transponder may be needed to provide coverage for the entire region. Other distinct coverage regions besides the continental United States include Europe, South/Central America, East Asia, Middle East, North Atlantic, etc. It is anticipated that in service regions larger than the continental United States, that a plurality of satellites 18 each incorporating one or more transponders may be required to provide complete coverage of the region.

The receive antenna 82 and transmit antenna 74 are each preferably disposed on the top of the fuselage of their associated aircraft 12. The receive antenna 74 of each aircraft 12 receives the entire RF transmission of encoded RF signals representing the IP data content packets from at least one of the transponders $18a_1$–$18a_4$. The receive antenna 82 receives horizontally polarized (HP) and vertically polarized (VP) signals which are input to at least one of the receivers 66. If more than one receiver 66 is incorporated, then one will be designated for use with a particular transponder $18a_1$–$18a_4$ carried by the target satellite 18 to which it is pointed. The receiver 66 decodes, demodulates and down-converts the encoded RF signals to produce video and audio signals, as well as data signals, that are input to the server 50. The server operates to filter off and discard any data content not intended for users on the aircraft 12*a* and then forwards the remaining data content via the LAN 56 to the appropriate access stations 88. In this manner, each user receives only that portion of the programming or other information previously requested by the user. Accordingly, each user is free to request and receive desired channels of programming, access email, access the Internet and perform other data transfer operations independently of all other users on the aircraft 12*a*.

An advantage of the present invention is that the system 10 is also capable of receiving DBS transmissions of live television programming (e.g., news, sports, weather, entertainment, etc.). Examples of DBS service providers include DirecTV and Echostar. DBS transmissions occur in a frequency band designated for broadcast satellite services (BSS) and are typically circularly polarized in North America. Therefore, a linear polarization converter may be optionally added to receive antenna 82 for receiving broadcast satellite services in North America. The FSS frequency band that carries the data services and the BSS frequency band that carries DBS transmissions are adjacent to each other in the Ku-band. In one optional embodiment of the system 10, a single Ku-band receive antenna can be used to receive either DBS transmissions from DBS satellites 18*c* and 18*f* in the BSS band or data services in the FSS band from one of the FSS satellites 18*a* or 18*b*, or both simultaneously using the same receive antenna 82. Simultaneous reception from multiple satellites 18 is accomplished using a multi-beam receive antenna 82 or by using a single beam receive antenna 82 with satellites co-located in the same geostationary orbit slot.

Rebroadcast television or customized video services are received and processed by the mobile system 20 in exactly the same way. Rebroadcast or customized video content is obtained from the video content source 32 and transmitted via the ground station 22 to the FSS satellites 18a and 18b. The video content is appropriately encoded for transmission by the content center 24 before being broadcast by the ground station 22. Some customization of the rebroadcast content may occur on the server 50 (FIG. 2) of the mobile system 20 to tailor advertisements and other information content to a particular market or interest of the users on the aircraft 12a.

The bulk of data content provided to the users on each aircraft 12 is provided by using a private portal data content. This is implemented as a set of HTML pages housed on the server 50 of each mobile system 20. The content is kept fresh by periodically sending updated portions from a ground-based server located in content center 24, and in accordance with a scheduling function controlled by the NOC 26 of the ground segment 16. The server 50 can readily be configured to accept user log-on information to support authentication and authorization of users and to keep track of user and network accounting information to support a billing system. The authorization and accounting systems can be configured to communicate with the ground segment 16 to transfer accumulated data at convenient intervals to the NOC 26.

The system 10 of the present invention also provides direct Internet connectivity via satellite links for a variety of purposes, such as when a user on board the aircraft 12a desires to obtain data content that is not cached on server 50, or as an avenue for content sources to provide fresh content for the private portals. The server may be used to cache the most frequently requested web pages as well as to host a domain name system (DMS) look-up table of the most frequently accessed domains. The DMS look-up table is preferably maintained by the content center 24 and is periodically updated on the mobile system 20. Refreshing of the cached content of the portal may be accomplished by in-flight, periodic "pushed" cache refresh or at the gate of an airport terminal using any form of wired or wireless connection to the aircraft 12a, or via a manual cache refresh by a crew member of the aircraft 12 carrying on board a CD ROM and inserting it into the cache server. The invention 10 implements the in-flight periodic, pushed cache refresh updates over the satellite links. Preferably, refreshing of the cache content occurs during periods of low demand on the satellite links.

The optional air telephone system 28 can also be employed with the system 10 when line-of-sight links to the ground segments 16 are established to provide the physical infrastructure. For example, an optional implementation incorporating an air telephone systems can be used for low data rate return links (2.4 kbps to 9.6 kbps). It will be recognized that other regions, such as Europe and Asia, have similar air telephone systems that communicate with aircraft using terrestrial cellular communications links. Air telephone systems (e.g., NATS in North America) were designed for carrying telephony traffic, but have been adapted to pass single user per call, point to point analog modem data. With the present invention, the aggregate return link traffic from the mobile system 20 is combined in server/router 50, a switch or a PBX (not shown) and then coupled into the air telephone return link via an analog modem or directly via a digital interface (e.g., CEPT-E1). Expanded capacity can be provided by establishing multiple simultaneous connections from the router/switch into the air telephone system. Multi-link, point to point (PPP) data encapsulation can be used to accomplish the splitting/re-combining of the data streams between the airborne and NOC routers. In addition to expanded capacity, the tolerance to a single connection failure is increased with multiple connections through the air telephone system. The handover between separate air telephone system antenna towers is managed by the air telephone system and the connection between the respective air and ground routers is automatically maintained as the mobile platform traverses multiple coverage areas.

A significant anticipated application of the present invention is in connection with aircraft that fly extended periods of time over water and remote regions (including polar regions) of the Earth where there is little or no current satellite transponder coverage. The present invention can operate with GSO satellites launched in the future into orbit over oceans, or a new constellation of NGSO satellites to provide full Earth coverage (including the poles).

Referring further to FIG. 1, a transmission of data content from the aircraft 12a to the ground station 22 will be described. This transmission is termed a "return link" transmission. The antenna controller 86 causes the transmit antenna 74 to maintain the antenna beam thereof pointed at the target satellite 18a. The channels used for communication from each mobile system 20 back to the ground station 22 represent point-to-point links that are individually assigned and dynamically managed by the NOC 26 of the ground segment 16. For the system 10 to accommodate several hundred or more aircraft 12, multiple aircraft will need to be assigned to each transponder carried by a given satellite 18. The preferred multiple access methods for the return link are code division multiple access (CDMA), frequency divisional multiple access (FDMA), time division multiple access (TDMA) or combinations thereof. Thus, multiple mobile systems 20 may be assigned to a single transponder $18a_1$–$18a_4$. Where a greater number of aircraft 12 incorporating a mobile system 20 are operated within the coverage region 14a, then the number of transponders required increases accordingly.

The receive antenna 82 may implement a closed-loop tracking system for pointing the antenna beam and for adjusting the polarization of the antennas based on receive signal amplitude. The transmit antenna 74 is slaved to the point direction and polarization of the receive antenna 82. An alternative implementation could use an open-loop tracking method with the pointing direction and polarization determined by knowledge of mobile platform position and attitude using an on-board inertial reference unit (IRU) and knowledge of the location of the satellites 18.

Encoded RF signals are transmitted from the transmit antenna 74 of the mobile system 20 of a given aircraft 12 to an assigned one of the transponders $18a_1$–$18a_4$, and transponded by the designated transponder to the ground station 22. The ground station 22 communicates with the content center 24 to determine and provide the appropriate data being requested by the user (e.g., content from the world wide web, email or information from the user's VPN).

An additional concern that must be taken into account with the system 10 is the potential for interference that may result from the small aperture size of the receive antenna 82. The aperture size of the receive antenna 82 is typically smaller than conventional "very small aperture terminal" (VSAT) antennas. Accordingly, the beam from the receive antenna 82 may encompass adjacent satellites along the geosynchronous arc. This can result in interference from satellites other than the target satellite being received by a particular mobile system 20. To overcome this potential problem, the system 10 preferably uses a lower than normal forward link data rate that overcomes the interference from adjacent satellites. For example, the system 10 operates at a preferred forward link data rate of at least about 5 Mbps per transponder, using a typical FSS Ku-band transponder (e.g., Telstar-6) and an antenna having an active aperture of about 17 inches by 24 inches (43.18 cm by 60.96 cm). For comparison purposes, a typical Ku-band transponder usually operates at a data rate of approximately 30 Mbps using conventional VSAT antennas.

Using a standard digital video broadcast (DVB) waveform, the forward link signal typically occupies less than 8 MHz out of a total transponder width of 27 MHz. However, concentrating the transponder power in less than the full transponder bandwidth could create a regulatory concern. FCC regulations presently regulate the maximum effective isotropic radiated power (EIRP) spectral density from a transponder to prevent interference between closely spaced satellites. Accordingly, in one preferred embodiment of the present invention, spread spectrum modulation techniques are employed in modulator 70 to "spread" the forward link signal over the transponder bandwidth using well known signal spreading techniques. This reduces the spectral density of the transponded signal, thus eliminating the possibility of interference between two or more mobile systems 20.

It is also equally important that the transmit antenna 74 meets regulatory requirements that prevent interference to satellites adjacent to the target satellite 18. The transmit antennas used in most mobile applications also tend to be smaller than conventional VSAT antennas (typically reflector antennas that are 1 meter in diameter). Mobile transmit antennas used for aeronautical applications should have low aerodynamic drag, be lightweight, have low power consumption and be of relatively small size. For all these reasons, the antenna aperture of the transmit antenna 74 is preferably smaller than a conventional VSAT antenna. VSAT antennas are sized to create an antenna beam that is narrow enough to illuminate a single FSS satellite along the geosynchronous arc. This is important because FSS satellites are spaced at 2° intervals along the geosynchronous arc. The smaller than normal antenna aperture of the transmit antenna 74 used with the present invention, in some instances, may create an antenna beam that is wide enough to irradiate satellites that are adjacent to the target satellite along the geosynchronous arc with RF energy having a power spectral density that could create an interference problem.

The above potential problem is eliminated in one preferred implementation of the present invention by a method for operating and managing multiple satellite return links through a common shared transponder (e.g., satellite transponder 18$a_1$), and more specifically managing the maximum radiated PSD of the RF signals transmitted by each of the mobile systems 20 such that the aggregate PSD does not exceed a maximum regulatory PSD limit. This implementation of the present invention thus enables efficient return link system capacity management in a communication system comprised of large quantities (hundreds or thousands) of aircraft 12 each having a mobile system 20, and operating with a wide variety of different antennas. The present invention also takes into account different data rates at which each of the mobile systems 20 may be transmitting, as well as the effects of the location of each aircraft 12 over a wide geographic coverage region, for example, the continental United States.

Figure 3:
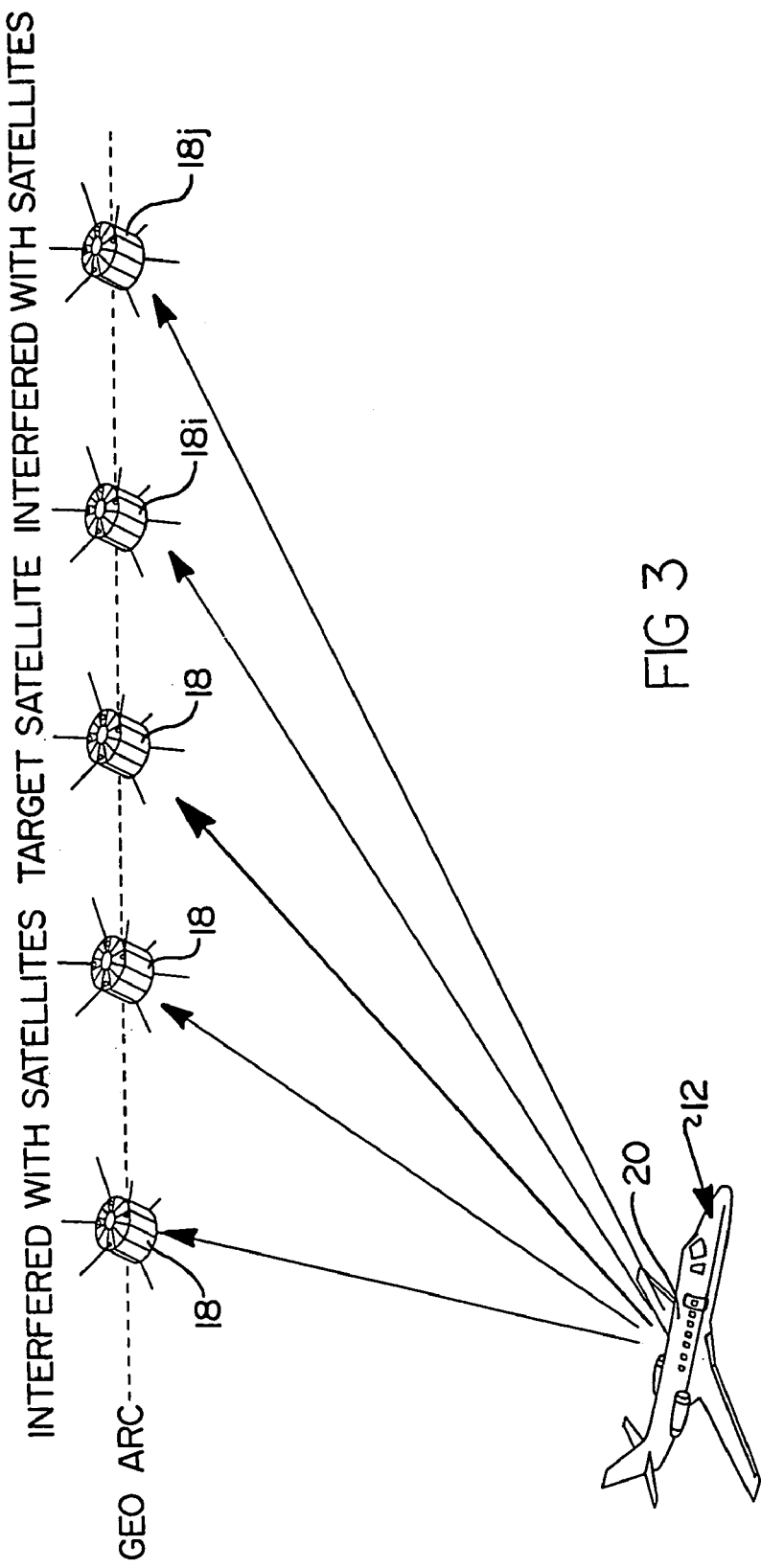
FIG. 3 illustrates a plurality of satellites disposed along a geostationary arc adjacent to a target satellite, and the potential interference that can be caused by the RF transmissions intended for the target satellite.

The above-described interference problem is illustrated in FIG. 3. The mobile system 20 radiates power towards a "target" satellite 18$a$. However, because of the small aperture transmit antenna 74 that is used with the mobile system 20, it causes radiated energy to impinge on not just the target satellite 18$a$, but potentially satellites 18$g$ through 18$j$ which are disposed adjacent the target satellite 18$a$ along the geostationary arc 90. This can create interference with the operation of satellites 18$g$ through 18$j$, so regulatory agencies such as the FCC and ITU strictly regulate the PSD of the RF signals that are broadcast. The regulatory requirements for operation of mobile satellite systems in the Ku frequency band are that the aggregate adjacent satellite interference potential does not exceed, at any time, that which would be caused by a single Earth station operating with a power into its antenna of −14 dBW/4 KHz and an antenna that complies with the side lobe requirements of section 25.209(a) of the FCC radio regulations for all angles along the visible portion of the geostationary satellite orbit. Similar regulatory limits apply to operation in Europe and other regions of the world. The FCC further requires that the RF transmissions from any number of mobile terminals are only allowed to provide a deterministic, aggregate adjacent satellite interference which does not exceed, at any time, that which would be caused by a single VSAT Earth station. Still further, the FCC requires that independent mobile units may transmit only on command from a central hub terminal via the forward link. Accordingly, the operation of multiple independent mobile terminals must not produce an aggregate PSD which exceeds, at any time, a predetermined PSD limit, and further that each of the mobile terminals can only transmit on command from a central hub terminal.

Figure 4:
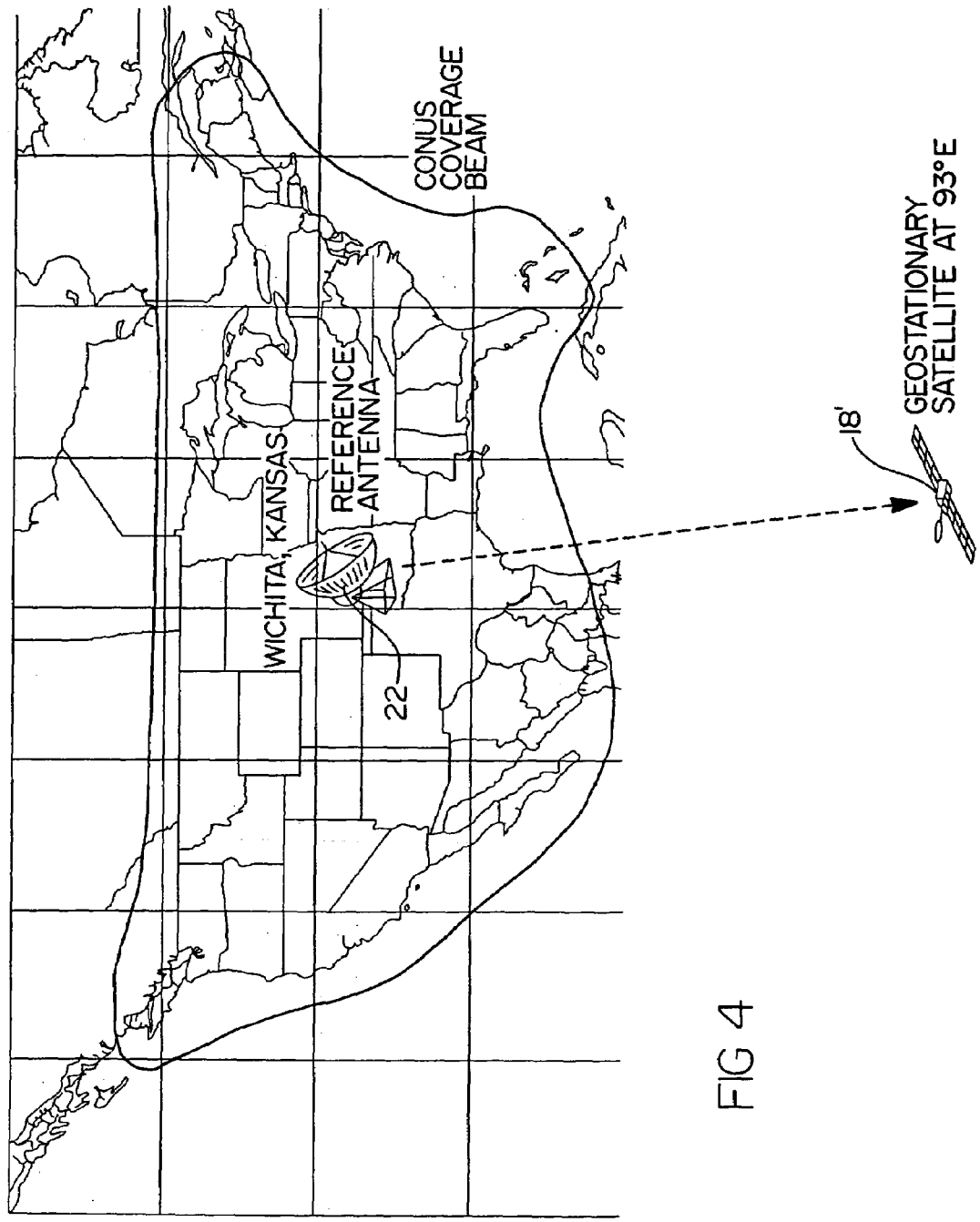
FIG. 4 illustrates a coverage region represented by the continental United States, with a reference VSAT antenna located at the approximate geographical center of the coverage region.

An example of an implementation of the invention is shown in FIG. 4, where the coverage region is shown as the continental United States ("CONUS"). The reference ground station 22 of the ground segment 16 is located in Wichita, Kans. Satellite 18' is a geostationary satellite (in this example Telstar 6 at 93 degrees West). When operating within CONUS, it is the object of this invention that the aggregate interference produced by all mobile terminals sharing a transponder on, for instance Telstar 6 satellite, not exceed the maximum permitted EIRP spectral density radiated along the geostationary 90° arc by a reference ground station 22 located in the center of the CONUS coverage region, as illustrated in FIG. 4. The EIRP spectral density pattern from a single mobile system 20 is determined by its transmitted power, antenna gain pattern and occupied signal bandwidth. Given a particular antenna (with a fixed gain), the only parameters available to control PSD are transmit power (P) and signal bandwidth (B). Mobile antennas are necessarily low gain antennas, so that higher transmit power is required to achieve the EIRP necessary to close the communication link with the satellite transponder 18$a_1$. The EIRP can be expressed as the product of the gain (G) and transmit power ($P_t$). Accordingly, if a certain desired EIRP is required to close the communication link, then the only variable available to control EIRP density is the signal bandwidth (B). The EIRP spectral density can thus be expressed as: EIRP/B.

In practice, for low gain (small aperture) antennas, operating at moderate to high data rates (greater than 16 Kbps), using typical FSS transponders, the bandwidth (B) of the signal is insufficient to meet the regulatory requirements without "spreading" the signal in frequency. While there are many previously developed methods for frequency spreading, the specific spreading technique used is not critical to the operation of the present invention; the only consideration is that some spreading method be employed to control bandwidth (B) so as to sufficiently reduce the EIRP spectral density of the transmitted signal to meet regulatory requirements, and that the spreading method permit multiple mobile terminals to access a common frequency channel without causing unacceptable interference with each other. One such existing method of spreading, which is the preferred method for use with this invention, is direct sequence spread spectrum, as previously mentioned. Each of the mobile systems 20 is assigned a unique pseudo noise spreading code by the central controller 26 to facilitate this spreading.

Maintaining the aggregate EIRP spectral density below the known regulatory limit requires that each mobile system 20 sharing a return link satellite transponder (e.g., transponder $18a_1$) be under strict transmit power control. The system 10 employs a dual loop control system method whereby the ground segment 16 measures the receive "Eb/No" for each mobile system 20 accessing, or attempting to access, the system. With this method a first closed control loop is employed via the ground segment 16 to measure the receive Eb/No from each aircraft 12, and then to transmit EIRP control commands to the mobile system 20 to thereby maintain the Eb/No of the receive signal from the mobile system within a tight, predefined range. A second control loop implemented in the mobile system 20 on the aircraft 12 is used for maintaining the transmit EIRP at the level commanded by the ground segment 16, using the first control loop, during rapid movement of the aircraft. The second control loop on the aircraft is often required for mobile transmit antennas, such as phased arrays, that experience changes in directivity (causing changes in EIRP) with scan angle. The preferred embodiment of the invention includes the second control loop but the invention may optionally be implemented without the second control loop when using "constant aperture" transmit antennas, such as reflector and lens antennas, that do exhibit directivity changes with scan angle, or for mobile platforms that do not rapidly change attitude. The aircraft-to-ground control loop (i.e., the first control loop) has about 0.5 seconds of roundtrip GEO delay so it cannot react as quickly to aircraft movement.

Figure 7:
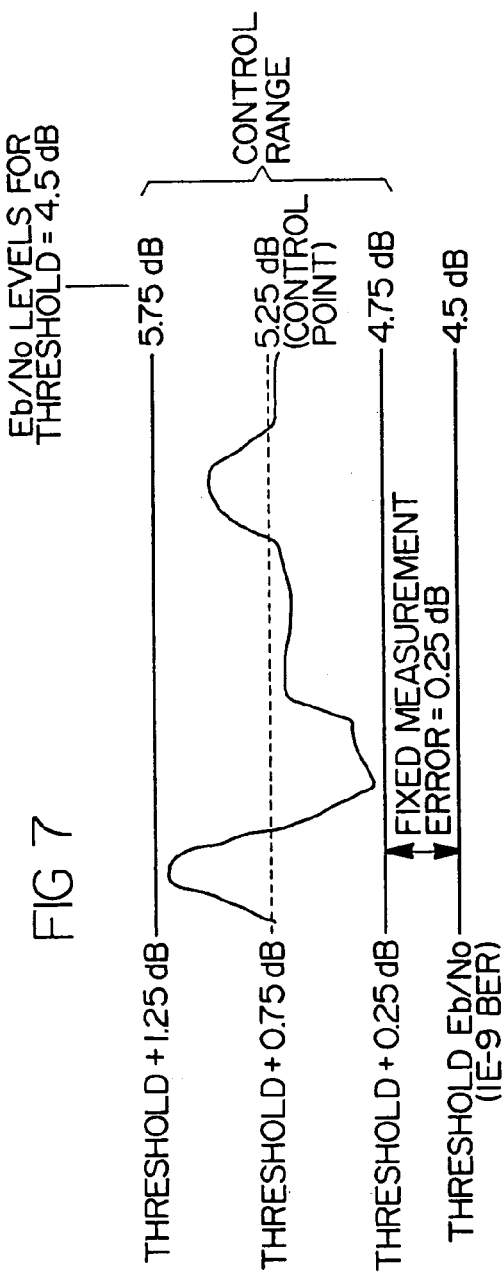
FIG. 7 is a graph illustrating a preferred signal-to-noise (Eb/No) control range used by the power control method of the present invention.

The above-described dual control loop control method can maintain the receive signal Eb/No from each aircraft 12 within a tight control range of about +/−0.5 dB with about 99.7% probability for the full range of typical aircraft motion. This power control system achieves two important objectives: maintaining the receive Eb/No for all aircraft 12 above a threshold Eb/No level corresponding to a desired bit error rate (i.e., 1E-9); and maintaining the time variation of Eb/No within a tight control range (i.e., +/−0.5 dB). The goal is for the mobile terminals to use the minimum transmit EIRP (and hence PSD) to close the communication link with a desired bit error rate (BER). The threshold Eb/No level for a 1E-9 BER is dependent on the forward error correction (FEC) code selected and other waveform parameters. One preferred Eb/No control range used by the system 10 is illustrated in FIG. 7. The performance of the control loop is determined by many design parameters, but key among them is the error in measuring receive Eb/No on the ground. The ground receiver (not shown) associated with the ground station 22 has typically fixed or slowly varying error in addition to a random (rapidly varying) error caused by the noise in the measurement value. In this example, the fixed error term requires that the control range be shifted up by 0.25 dB, as shown in FIG. 7, so that the actual Eb/No stays above the threshold level.

EIRP commands are transmitted from the ground station 22 to the aircraft 12 using delta levels rather than absolute levels. This is because absolute EIRP levels cannot typically be accurately set on the aircraft 12 but changes from one level to another can be very accurate. Because absolute EIRP cannot be accurately set on the aircraft 12, new mobile systems 20 attempting to access the system 10 which are not under return link power control typically make their initial transmission at an EIRP level that is above the power control range. The power control system quickly brings them into the control range within a few seconds. The system 10 accounts for the additional PSD contributed by the new aircraft 12 being admitted to the communications link by strictly controlling when and how many new aircraft can enter the link by using a polling method, as well as booking a worst case PSD contribution for all aircraft that are acquiring a return link.

Figure 8:
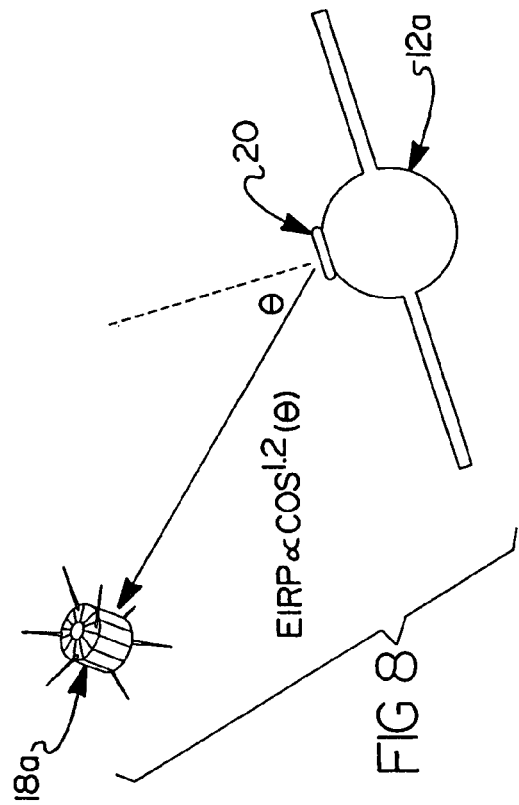
FIG. 8 is a simplified illustration of the elevation scan angle of an antenna of a mobile system to a target satellite.

Movement of the aircraft 12a causes the largest and fastest control loop disturbances. The aircraft's 12a transmit antenna 74 is always pointing its beam at the target satellite 18a so that changes in pitch and roll of the aircraft cause the elevation scan angle of the antenna 74 (or antenna 82) of its mobile system 20 to vary, as shown in FIG. 8. A characteristic of a transmit phased array antenna, if such is employed with the mobile system 20, is that the EIRP is proportional to $\cos^{1/2}\theta$, where $\theta$ is the elevation scan angle to the satellite 18a. Therefore aircraft pitch/roll disturbances can cause a change in antenna elevation scan angle, which can cause a change in antenna directivity, leading to a change in EIRP. Changes in the EIRP lead to proportional changes in receive Eb/No on the ground, which is measured by the receiver at the ground station 22. The power control system then sends a command back to the aircraft to adjust EIRP, either up or down. In practice, the control loop managed by the mobile system 20 on each aircraft 12 minimizes the EIRP variations caused by aircraft disturbances, by measuring the change in antenna elevation scan angle and adjusting the drive level into the antenna (and hence the transmit power) to compensate for the change in directivity of the antenna, thereby maintaining the EIRP at the last commanded level.

The NOC 26, as mentioned above, is also used to determine the PSD contribution of each mobile system 20 accessing (or attempting to access) the system 10. Determining the PSD of each mobile system 20 is accomplished using a "reverse calculation" method. The first step in determining aircraft PSD is to determine the EIRP of the signal of the transmitter subsystem 64 on the aircraft 12a. Rather than have each aircraft 12 directly report their EIRP to the NOC 26, the system 10 uses a much more accurate method to work backwards from a known receive Eb/No at the ground station 22 through the target satellite 18, to determine the transmit EIRP of the signal from the mobile system 20. In a preferred embodiment of the invention the performance of the return link is completely driven by the link between the aircraft 12a and the target satellite 18a. Under this condition the receive Eb/No at the ground station 22 is known to be identical to the Eb/No at the output of the satellite transponder. The following equation for aircraft EIRP projected towards the target satellite 18a as a function of receive Eb/No at the ground station 22 is represented by equation 1 below:

$$EIRP_t = 16\pi^2 d^2 R (E_b/N_o)(kT+I_o)/(L\ G_r \lambda^2) \quad \text{(Equation 1)}$$

where:
d=slant range from aircraft to satellite
R=return link data rate
$E_b/N_o$=receive Eb/No at the ground station
k=Boltzmann's constant
T=noise temperature of transponder
$I_o$=interference noise spectral density L=atmospheric plus rain attenuation on uplink from aircraft to satellite $G_r$=transponder receive antenna gain $\lambda$=wavelength of transmission.

Once the EIRP directed towards the target satellite is calculated using Equation 1, the EIRP reaching the GEO plane as a function of offset angle θ along the GEO arc is next calculated knowing the antenna directivity pattern, $G(\theta)$, for the airborne transmit antenna 74, as indicated by the equation 2 below:

$$EIRP_i(\theta) = L\, EIRP_t G(\theta)/G_t \qquad \text{(Equation 2)}$$

where $EIRP_t$ is given by equation 1 and $G_t$, the transmit antenna gain to the target satellite 18a, is easily calculated from the antenna model. When equation 1 is substituted into equation 2, the loss term, L, cancels out, giving the actual EIRP reaching the GEO arc.

The parameters d, R, $G_r$, Eb/No and $\lambda$ are known by the NOC 26. Receive Eb/No for every aircraft 12 is constantly monitored and controlled. The term $(kT+I_o)/G_r$ is independently measured at the ground station 22 for each return link transponder. The term $I_o$ is equal to the interference noise power spectral density from other satellite systems and from other mobile terminals 20 sharing the transponder The geometry between the mobile terminal 20 and the target satellite 18 must be accurately known to solve equations (1) and (2). Therefore, the invention includes a method whereby all mobile terminals 20, periodically report their location and attitude to the NOC 26 using the return link.

For regulatory compliance, the aggregate PSD can be determined by the following formula:

$$\sum_{i=1}^{n} EIRP_i(\theta)/B_s \leq \text{Regulatory Mask}(\theta)$$

for all of θ where:

$EIRP_i(\theta)$=EIRP of $i^{th}$ mobile system 20 in the direction of θ.

$B_s$=spreading bandwidth.

N=number of mobile systems 20 simultaneously accessing the system

Figure 5:
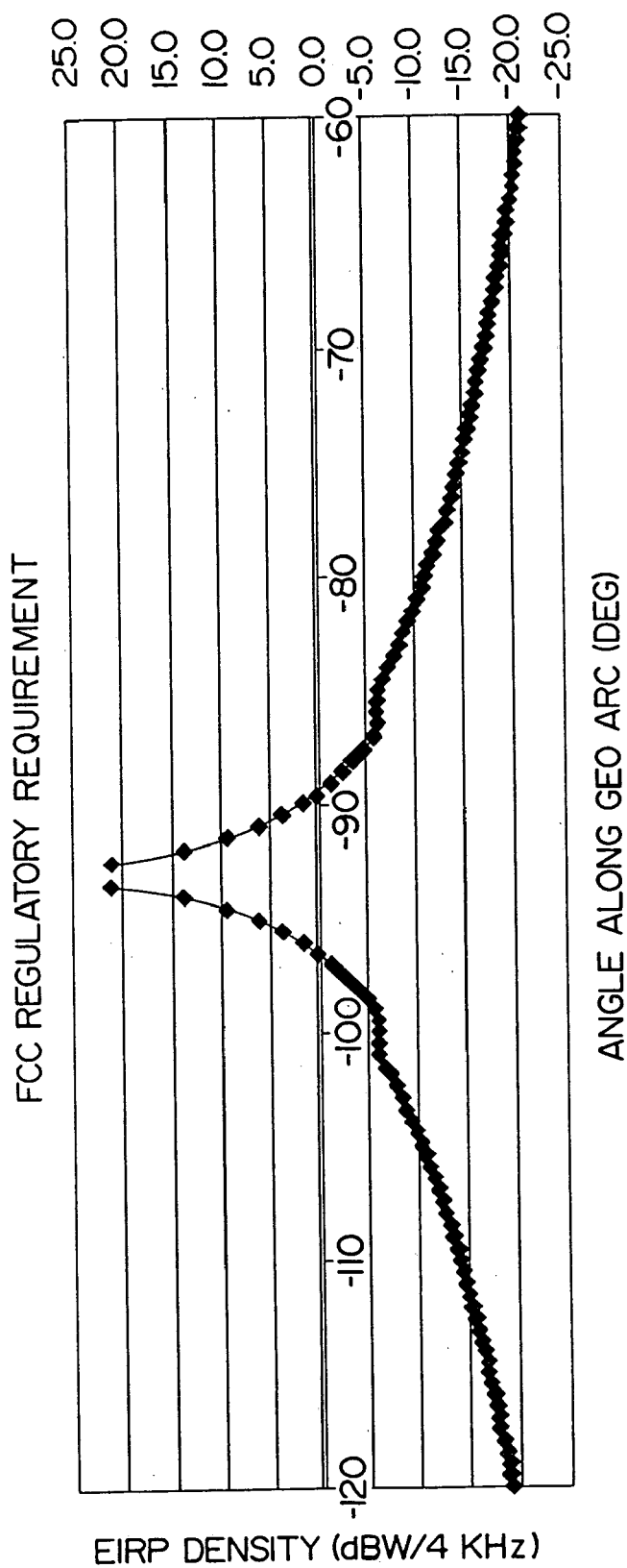
FIG. 5 is a graph of the maximum EIRP spectral density along a geostationary arc permitted under present day FCC regulations for the reference VSAT antenna located in Wichita, Kansas and the target satellite at 93 degrees west longitude, as shown in FIG. 4.

An example PSD regulatory mask is defined in Table 1 and depicted graphically in FIG. 5. This regulatory mask represents a PSD limit below which the invention must manage the power spectral density. The example regulatory mask is based on FCC requirement 25.209 for very small aperture terminals (VSATs) with −14 dBW/4 KHz power spectral density into the antenna.

TABLE I

Example PSD Regulatory Mask
(θ = offset angle from main beam center)

| EIRP Spectral Density Along the GEO Arc | | EIRP Spectral Density in Other Directions | |
|---|---|---|---|
| EIRP Spectral Density (dBW) | Theta (deg) | EIRP Spectral Density (dBW) | Theta (deg) |
| 15–25 log (θ), −6, | $1 \leq \theta \leq 7$ $7 \leq \theta \leq 9.2$ | 18–25 log (θ) −24, | $1 \leq \theta \leq 48$ $48 \leq \theta \leq 180$ |

TABLE I-continued

Example PSD Regulatory Mask
(θ = offset angle from main beam center)

| EIRP Spectral Density Along the GEO Arc | | EIRP Spectral Density in Other Directions | |
|---|---|---|---|
| EIRP Spectral Density (dBW) | Theta (deg) | EIRP Spectral Density (dBW) | Theta (deg) |
| 18–25 log (θ), −24, | $9.2 \leq \theta \leq 48$ $48 \leq \theta \leq 180$ | | |

Figure 6:
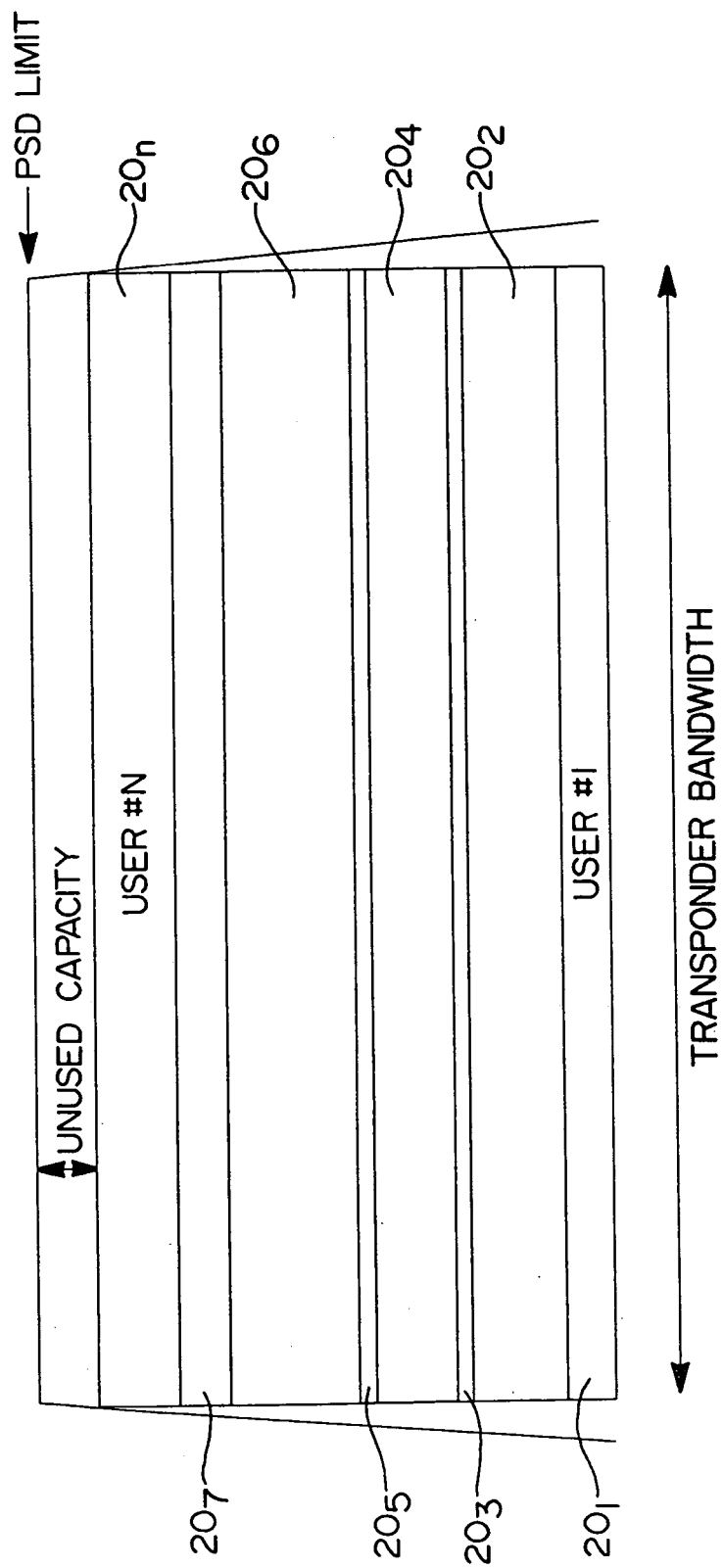
FIG. 6 is a simplified graph illustrating the aggregation of PSD from a plurality of mobile terminals that have spread their signals over the entire transponder bandwidth, and also showing the regulatory PSD limit that must not be exceeded.

The method of the present invention requires that all mobile systems 20 spread their transmit signal over a fixed bandwidth (B) where B is chosen to be large enough so that multiple user terminals can simultaneously access the system without exceeding the regulatory limits on total EIRP spectral density. In one preferred implementation, B is set equal to the bandwidth of the transponder (e.g., satellite transponder $18a_1$). Typical Ku-band transponders have a bandwidth of 27 MHz, 36 MHz or 54 MHz. These bandwidths are typically wide enough to allow multiple mobile systems 20 to simultaneously access a single return link transponder without exceeding regulatory limits. FIG. 6 illustrates how the EIRP from multiple mobile terminals $20_1–20_n$ is spread over the full transponder bandwidth, and the resultant aggregate PSD is maintained below the regulatory limit.

A second important feature of the invention is the use of a single, central controller 26a which preferably is part of the NOC 26 (FIG. 1), that manages the use of the communication resources (i.e., the satellite-based transponders $18a_{1-4}$) and regulates access to the return link from the many mobile systems 20 operating within the coverage region. The invention also involves a control scheme for "Demand Assigned Multiple Access" (DAMA) by which each mobile system 20 requests and releases capacity (data rate) through the central controller 26a. The central controller 26a operates to regulate the usage of the satellite-based transponder to achieve maximum efficiency while maintaining regulatory compliance.

Because the PSD contribution from each mobile system 20 is dependent on its location (and scan angle in the case of PAA antennas), and the location of the aircraft 12 will change over time, the PSD contribution from each mobile system 20 will be time varying. Accordingly, the system 10 requires that each mobile system 20 periodically report its position and antenna pointing angle to the central controller 26a so that the PSD contribution of each mobile system 20 to the aggregate can be updated. However, the PSD of the RF signal from any given mobile system 20 is expected to change slowly with time, even for relatively fast moving mobile platforms such as commercial jet aircraft. Accordingly, the central controller 26a typically will not need to calculate mobile system PSD patterns more often than once every several minutes. The exception to this statement occurs for mobile antenna that have gain patterns that are very sensitive to scan angle (such as phased array antennas). Mobile systems 20 having these antennas must report their parameters (position and antenna scan angle) more often when its associated aircraft is rapidly changing it's heading or attitude.

Figure 9:
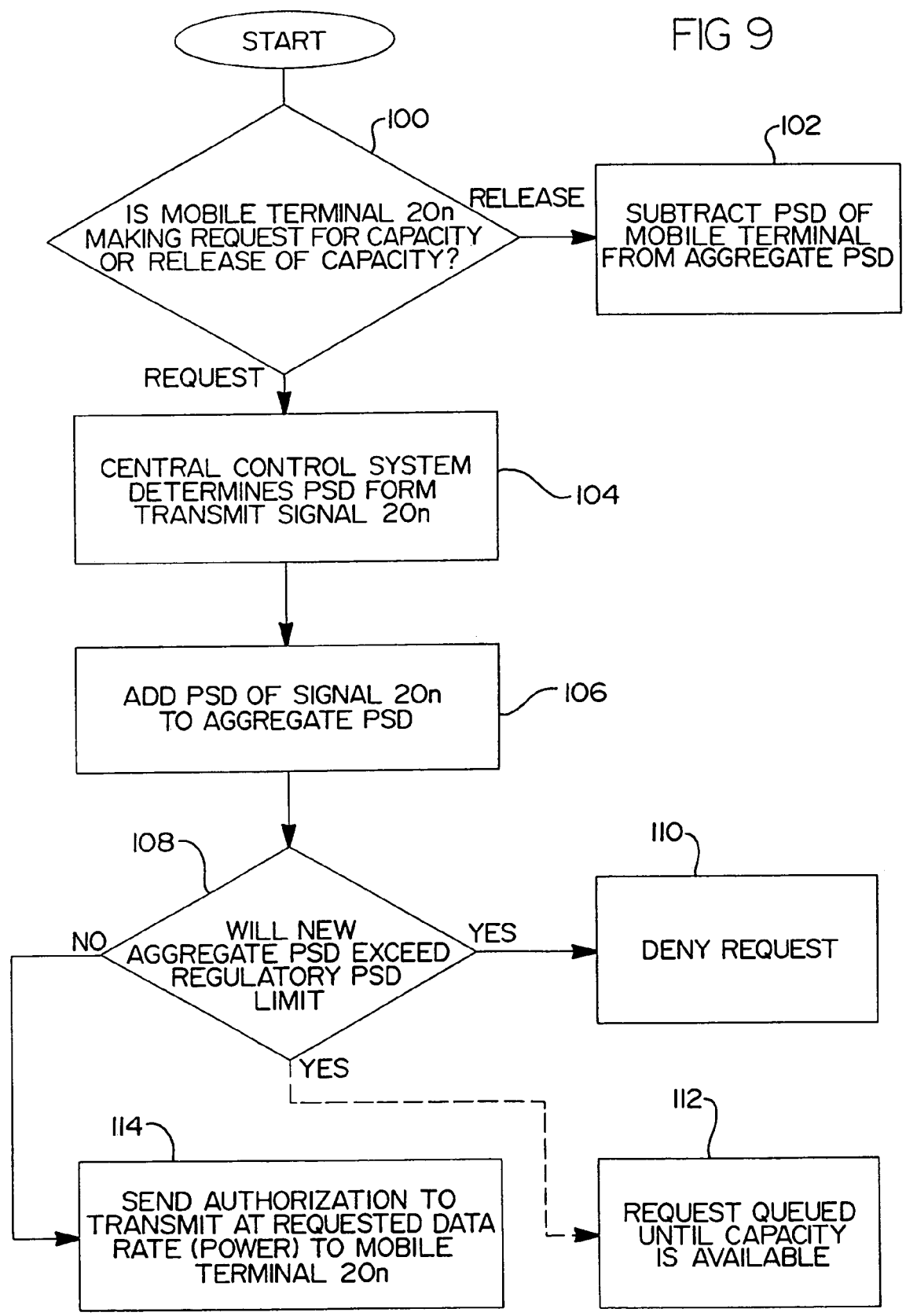
FIG. 9 is a flowchart of the basic steps of operation performed by the system of the present invention in managing access and data rate requests on a shared satellite transponder.

Referring to FIG. 9, initially a determination is made, at step 100, whether a request for capacity from a mobile system $20_n$ has been received by the central controller 26a or whether the mobile system $20_n$ is releasing capacity. If a release of capacity has occurred, then the central controller 26a subtracts the PSD of the mobile system $20_n$ releasing capacity from the aggregate PSD, as indicated at step 102.

Mobile system $20_n$ is required to make a request for data rate (power) to the central controller 26a if it wishes to access the satellite-based transponder $18a_1$ at a higher data rate than previously authorized, or if it wants initial authorization to operate at a specific data rate (power). This request provides the central controller 26a with the information described above necessary for the central controller to determine the PSD of the RF signal to be transmitted by the mobile system $20_n$. At step 104, the central controller 26a then determines the PSD for both the on-axis (along the geostationary arc) and off-axis PSD of the transmit signal. At step 106, the central controller 26a adds this PSD to the aggregate PSD of all other mobile systems 20 currently accessing the satellite 18a. The central controller 26a then compares the new aggregate PSD against the regulatory PSD limit, as indicated at step 108. If this comparison indicates that the PSD of the mobile terminal $20_n$ presently requesting access would cause the new aggregate PSD to exceed the predetermined regulatory PSD limit at any on-axis or off-axis offset angle, then access to the system 10 is denied, as indicated at step 110. Optionally, the request for additional capacity could be queued until the central controller 26a determines that additional capacity is available, as indicated at step 112. Only when sufficient PSD (i.e., capacity) becomes available (for instance by the release of data rate power by another mobile system 20) will the central controller 26a send an authorization to transmit signal to the mobile system $20_n$, as indicated at step 114.

In a similar manner, when a mobile system 20 no longer requires data rate (i.e., power), it is released to the central controller 26a so that it may be used by other mobile systems 20 sharing the transponder. No authorization by the central controller 26a is required before any mobile system 20 releases capacity. When the central controller 26a receives a release of data rate message from any mobile system 20 it subtracts the PSD of the released data rate from the aggregate PSD to form a new aggregate PSD.

In practice, the aggregate PSD monitored by the central controller 26a will be changing constantly as various mobile systems 20 operating within the coverage region request and release capacity (i.e., data rate) to the system 10, as well as initiate and terminate their communication sessions with the system 10. Optionally, if a request for authorization to transmit from a particular mobile system 20 is denied by the central controller 26a, the system 10 could assign the requesting mobile system to another transponder having available PSD capacity. No authorization to transmit is provided to any mobile system 20 attempting to access the system 10 unless the central controller 26a has determined that its RF emissions will not cause the aggregate PSD of all mobile systems 20 currently accessing the system 10 to exceed the regulatory PSD limit.

All mobile systems 20 operating within the coverage region operate to periodically request and release power as their data rates, locations, orientations, etc. change during the course of a communication session. Each mobile system 20 transmits with only as much power as required to close its communication link with the transponder $18a_1$ of the satellite 18a. This transmit power is a function of the data rate and many other parameters (i.e., slant range, antenna scan angle, etc.). The operation of adjusting the transmit power to maintain communication link closure may be referred to as "power control".

The system and method of the present invention can be used with any power control method that allows the central controller 26a to be apprised of power changes (by periodic messaging, for instance). The preferred method of power control is the dual loop power control method described above.

Another method of power control is the open loop approach, where each mobile system uses its known position on the Earth (provided usually via GPS) and its attitude, together with knowledge of the location of the satellite that it wants to communicate with, to determine the appropriate transmit power. Again, the transmit EIRP selected is only that amount that permits the communication link with the satellite to be closed. With the open loop approach, the mobile system 20 must periodically report its transmitted power to the central controller 26a. With either approach, it is important that the central controller 26a be apprised of the transmit power of each mobile system 20 accessing the system 10.

Figure 10:
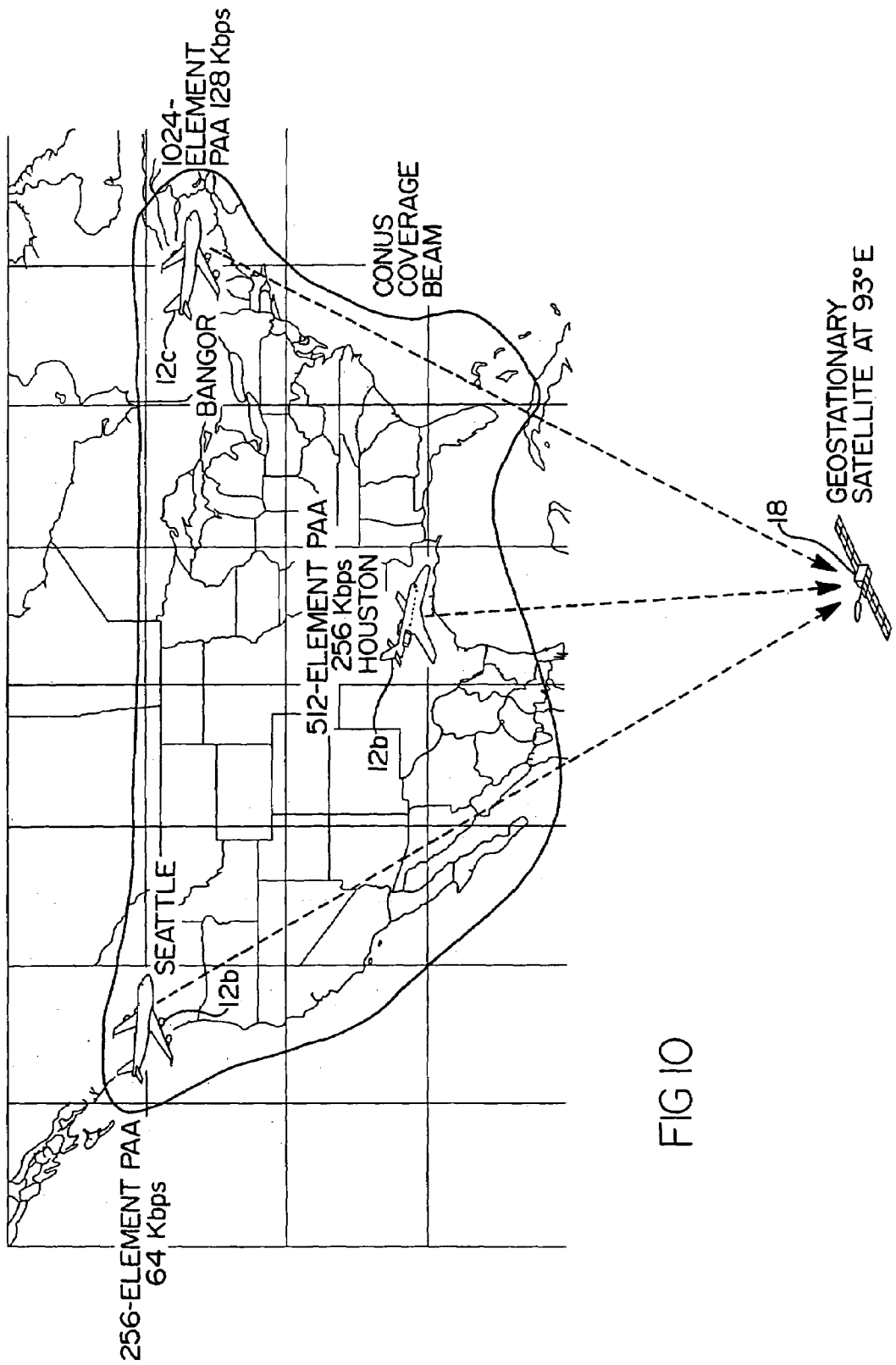
FIG. 10 is an illustration of three aircraft in different locations within a common coverage region, which are all accessing a single satellite-based transponder.

Referring now to FIG. 10, an example of the operation of the system and method of the present invention will be described. In this example, three aircraft 12a, 12b and 12c are each in communication with satellite transponder $18a_1$. Aircraft 12a is over Seattle, Wash., aircraft 12b is over Houston, Tex. and aircraft 12c is over Bangor, Me. For this example, further suppose that each aircraft 12 has a different sized phased array antenna (PAA), and that each is accessing the transponder of the satellite $18a_1$ at a different data rate. Aircraft 12a is using a 256 element (16×16) active phased array antenna and is transmitting at 64 Kbps using an EIRP of 34 dBW. Aircraft 12b is using a larger 512 element PM and transmits within an EIRP of 39 dBW and a data rate of 256 Kbps. Finally, aircraft 12c has an even larger aperture 1024 element PM operating at 128 Kbps and 37 dBW. Each of the mobile systems 20 of each aircraft 12a, 12b and 12c are pointing their antennas at the satellite transponder $18a_1$, which is located at 93° East longitude.

Figure 13:
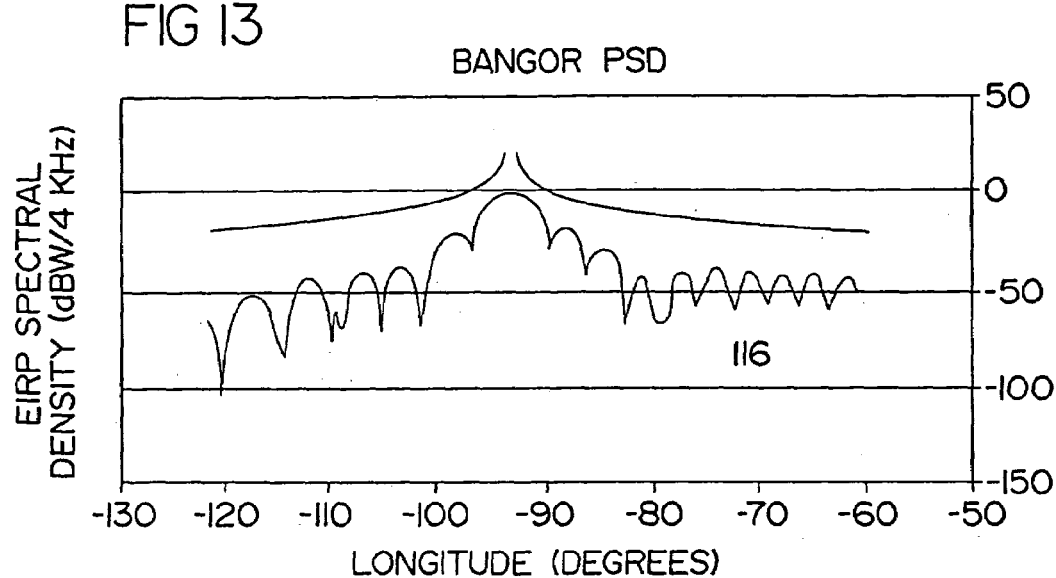
Figure 14:
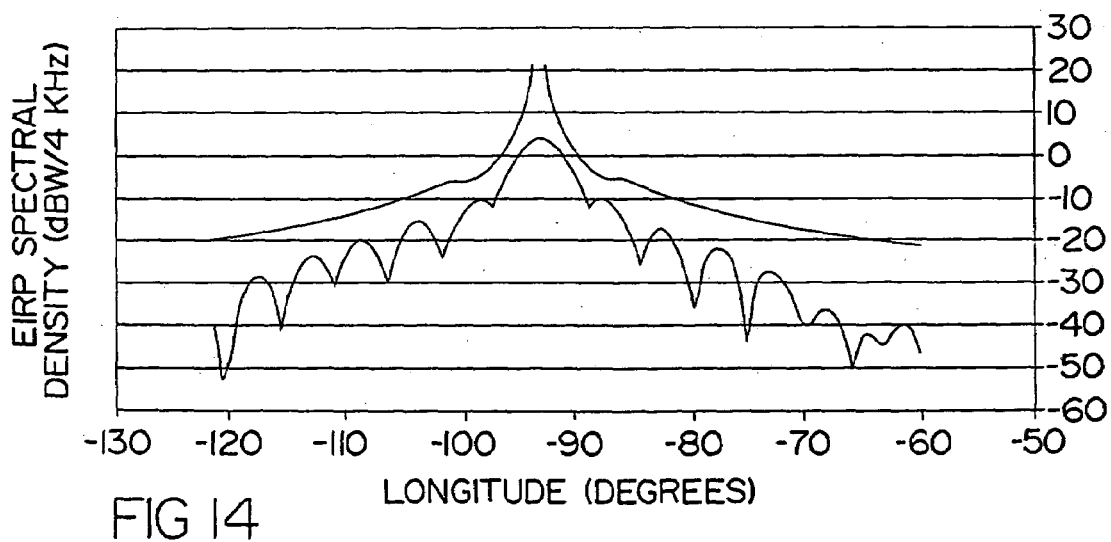
FIG. 14 is a graph illustrating how the aggregate PSD of the signals from the three aircraft shown FIG. 10 remains below the regulatory PSD limit at all points along the GEO arc.

The EIRP spectral density of the RF signal from aircraft 12a is shown in FIG. 11 and indicated by reference numeral 112. The EIRP spectral density of the RF signal from aircraft 12b is shown in FIG. 12 and indicated by reference numeral 114. The EIRP spectral density of the RF signal from aircraft 12c is shown in FIG. 13 and indicated by reference numeral 116. FIG. 14 illustrates the aggregate PSD determined by the central controller 26a. The aggregate PSD from all three aircraft is denoted by waveform 118. From FIG. 14, it can be seen that the aggregate PSD 118 remains below the on-axis regulatory PSD limit (i.e., "mask") 120 at all points along the geostationary arc. A similar check can be performed for off-axis PSD.

As described previously, the system 10 makes use of a model which enables the central controller 26a to accurately calculate the radiation pattern of the transmit antenna based on the aircraft-to-satellite beam pointing geometry. In actual operation, this antenna model is used by the central controller 26a so that antenna gain patterns can be computed for each type of antenna that will be used to access the system 10. Knowing the transmit power, the gain pattern and the spreading bandwidth, a PSD pattern can be calculated for each mobile system 20, as indicated in FIGS. 11–13. It then becomes a routine summing operation to sum the PSD contributions from each mobile system 20 to calculate the aggregate PSD as shown in FIG. 14. In this example, the aggregate PSD is less than the regulatory PSD limit so additional mobile systems 20 can be admitted access to the system 10 or existing users may increase their transmit power (i.e., data rate). Since data rate is proportional to transmit power, which is proportional to PSD, it can be said that the present invention manages power, PSD, data rate or capacity.

Referring now to FIGS. 15–18, a more detailed description of the system 10 for monitoring and controlling the aggregate PSD of all aircraft 12 will be provided. The present invention 10 incorporates a return link power controller (RLPC) 130. The RLPC 130 includes a scan angle compensator 132 and an airborne receive/transmit subsystem (ARTS) 134. The scan angle compensator 132 comprises a software program which is an important component of the RLPC 130. This component will be discussed in greater detail in the subsequent drawing figures, but it is essentially implemented in software that resides onboard the aircraft 12 and interfaces to other hardware on the aircraft. It compensates for the relatively fast rolling and pitching motion of the aircraft 12. More specifically, it compensates for changes in transmit antenna 74 scan angle which are the direct result of aircraft motion. It is referred to as a "fast" scan angle compensator because it generates correction commands at a rate of approximately 10 commands per second which, when compared to other portions of the RLPC 130, is about 10 times faster than such other portions. The input to the scan angle compensator 132 is the actual transmit antenna scan angle. The output from scan angle compensator 132 represents a time series of correction commands in the form of ARTS 134 antenna power levels.

The ARTS 134 is a hardware component which is in communication with the communications subsystem 52 (FIG. 2). The ARTS 134 accepts commands either from the ground station 22 or from the onboard scan angle compensator 132 for setting antenna 74 power levels and generating an output power level as close as possible to the commanded power level. The inputs to the ARTS 134 are the actual antenna scan angle, the power commands from the scan angle compensator 132, and the power commands from the ground-based central controller 26a. The output of the ARTS 134 is simply a simulated value of Eb/No. The ARTS 134 may output more than just the value of Eb/No, but for the present discussion, the Eb/No is all that is needed.

Block 136 represents an input level of Eb/No that the system 10 is intended to control to. In actual practice of the RLPC 130, this value will typically be set by some external entity and accepted by a ground component of the RLPC 130. The output of block 136 represents a time series of commanded Eb/No values.

The RLPC 130 further includes a summing component 138 and a reporting algorithm 140. The summing component 138 takes the difference between the commanded (desired) Eb/No, represented by block 136 and the value that was measured and reported from reporting algorithm 140 (to be discussed momentarily), thereby generating an error used to drive the RLPC system 130. Summing component 138 resides in software running on one or more computers of a data center 155 shown in FIG. 1, which forms a portion of the ground station 22. The output of summing component 138 represents a time series of error values that reside completely in software.

The reporting algorithm 140 comprises a major portion of the RLPC 130. It represents a software program residing on computer equipment associated with the data center 155. It is used to sample the Eb/No measurements that are generated by a ground receive/transmit system (GRTS) 143. The GRTS 143 is not a part of the RLPC 130. The reporting algorithm 140 limits the size of the Eb/No measurements to ensure that occasional spurious measurement data is used by the RLPC system 130. The output from the reporting algorithm 140 is simply a repeat of the input Eb/No measurement except that the output is taken only at specific and regular time intervals.

The output of the summing component 138 is input to a slow loop ground controller 142 which also forms an important component of the RLPC system 130. The slow loop ground controller 142 contains many subcomponents which will be discussed momentarily. It is implemented in software that resides on computers of the data center 155 (FIG. 1).

The slow loop ground controller 142 compensates for any form of disturbance in Eb/No that can be measured by the computers of the data center 155. It is referred to as "slow" because it essentially can only generate power corrections about once every second. The input to the slow loop ground controller 142 is an error signal and its output is the computed power level commands which are transmitted to the aircraft 12.

Figure 16:
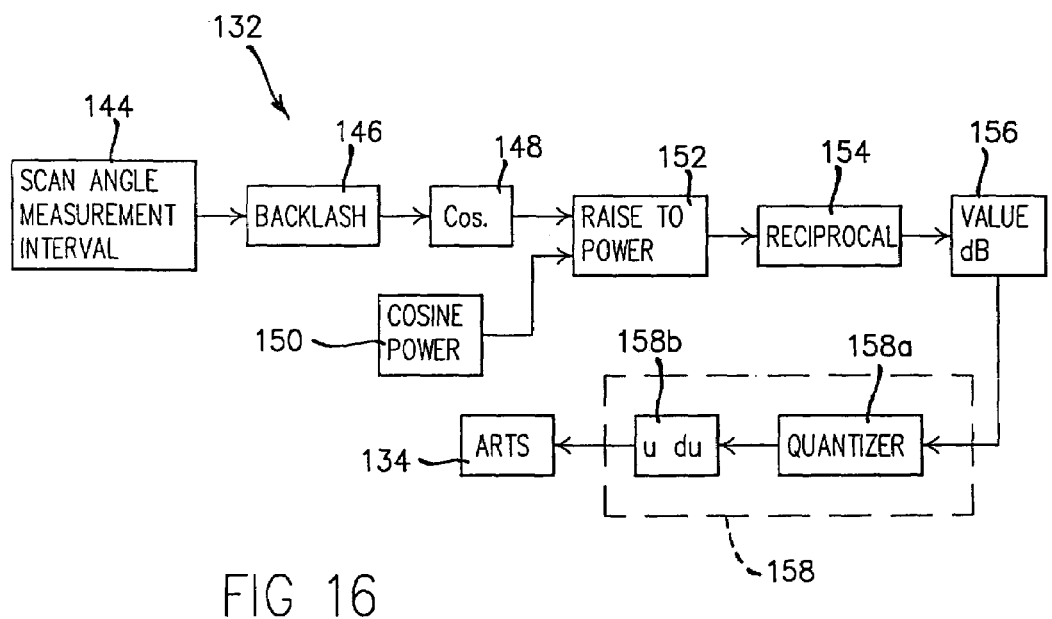
FIG. 16 is a more detailed block diagram of the scan angle compensator of the present invention.

Referring now to FIG. 16, the scan angle compensator 132 is shown in greater detail. The scan angle compensator 132 includes a "scan angle measurement interval" subsystem 144 which is contained in software on board the aircraft in the ARTS 134. This subsystem essentially samples the scan angle measurement at regular intervals. The presently preferred sampling interval is 100 milliseconds. Thus, every 100 milliseconds, a new sample of the scan angle is taken. During the period when a sample is not being taken, the last sampled value is held on the output of subsystem 144 until the next sample is taken.

Block 146 represents a "backlash". This block is contained in software associated with the ARTS 134 onboard the aircraft 12. It is used to provide backlash to its input. That is, the output from block 146 will not change unless the input changes beyond a certain value. When this happens, the output changes as much as the input changes. If the input changes direction, the output will not change until the input changes by a predetermined magnitude. This function is helpful for making sure the RLPC system 130 does not react to very small noise spikes. Currently the preferred backlash "deadzone" is zero; therefore, block 146 has no affect on its input. It is illustrated, however, as an optional element that is available for fine tuning the performance of the system RLPC 130.

The "cosine" block 148, also is contained in the software of the ARTS 134 onboard the aircraft 12 and is used to output just the cosine of its input. The "cosine power" block 150 is also contained in the software onboard the aircraft 12. Block 150 outputs a constant value (preferably a value of 1.2) which is used to take the output of block 148 to a particular power. Its function is to try to approximate the actual behavior of the transmit antenna 74 because its own gain is affected by the scan angle in the form of $\cos(\theta)^{1.2}$, where "$\theta$" is the scan angle. Therefore, the scan angle compensator 132 can predict what the antenna 74 is doing to try to counter the effects of this behavior.

The outputs from blocks 148 and 150 are input to a "raise-to-power" block 152, which is also an important part of the scan angle compensator 132. Block 152 is contained in software in the ARTS 134 onboard the aircraft and is used to raise the value of the output from cosine block 148 to that of the output of cosine power block 150. Block 152 is also used to help the scan angle compensator 132 to predict what the antenna 74 is doing and to try to counter the effects of this behavior.

Figure 15:
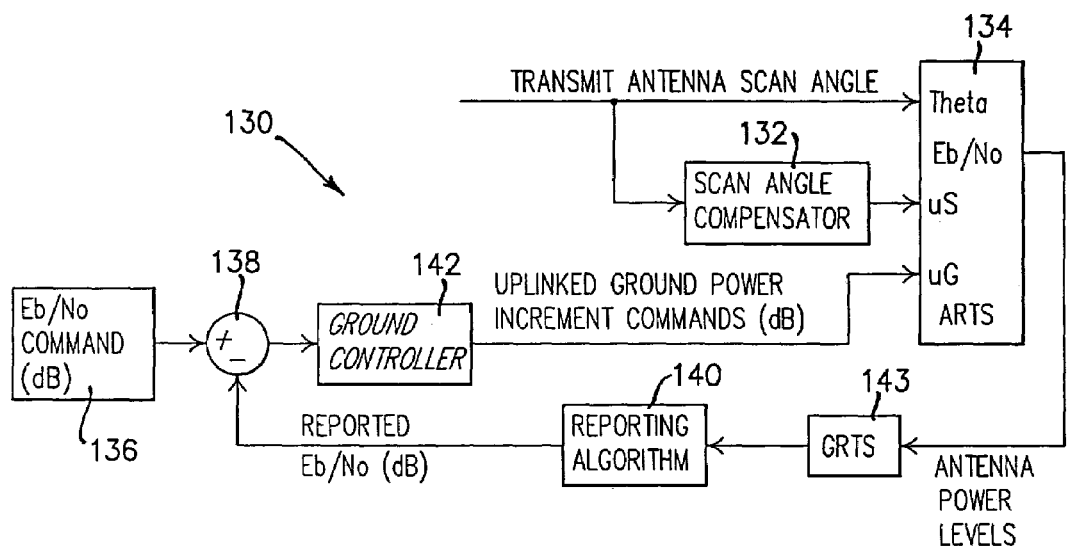
FIG. 15 is a block diagram of a return link power controller in accordance with a preferred embodiment of the present invention.

The output from the raise to power block 152 is input to a "reciprocal" block 154, an important part of the invention. Block 154 is contained in the software in the ARTS 134 onboard the aircraft 12 and it outputs the reciprocal of its input. This is done because the output of the fast scan angle compensator 132 will eventually multiply the actual desired power level from the ARTS 134 (FIG. 15). Thus, when this value (1/x) is multiplied by the actual value (which should be close to x, which is what blocks 148–152 are trying to predict), the results should be close to 1. This means that no matter what the scan angle does, the final output will nearly always be 1. This value will be used to multiply other values within the system 130, so if it is kept near 1, then the final value of the overall system will not change much.

Block 156 is a decibel conversion block that is contained in the software of the ARTS 134 onboard the aircraft 12. Block 156 converts the signal on its input to decibels (dB), which is the common unit of measurement in most communication systems. Depending upon the precise architecture of the RLPC 130, block 156 may not be needed.

Block 158 performs an "aggregation" function on the output from block 156. Block 156 actually is a combination of a "quantizer" 158a and a "diff1" block 158b. At every sample time, the output of diff1 block 158b is the difference between the input from the previous sample and the input from the current sample. Aggregation block 158 functions to output the change in its input at each time step. In this case, because of the 100-millisecond sampling of block 144, a time step is every 100 milliseconds. Every 100 milliseconds blocks 158a and 158b compute that change in input from the previous 100 millisecond period and output this change. The quantizer 158a ensures that the changes are at least of a specific level (currently 0.1 dB) before a change is reported. The output from the aggregation block 158 is input to then transmitted to the ARTS 134.

Figure 17:
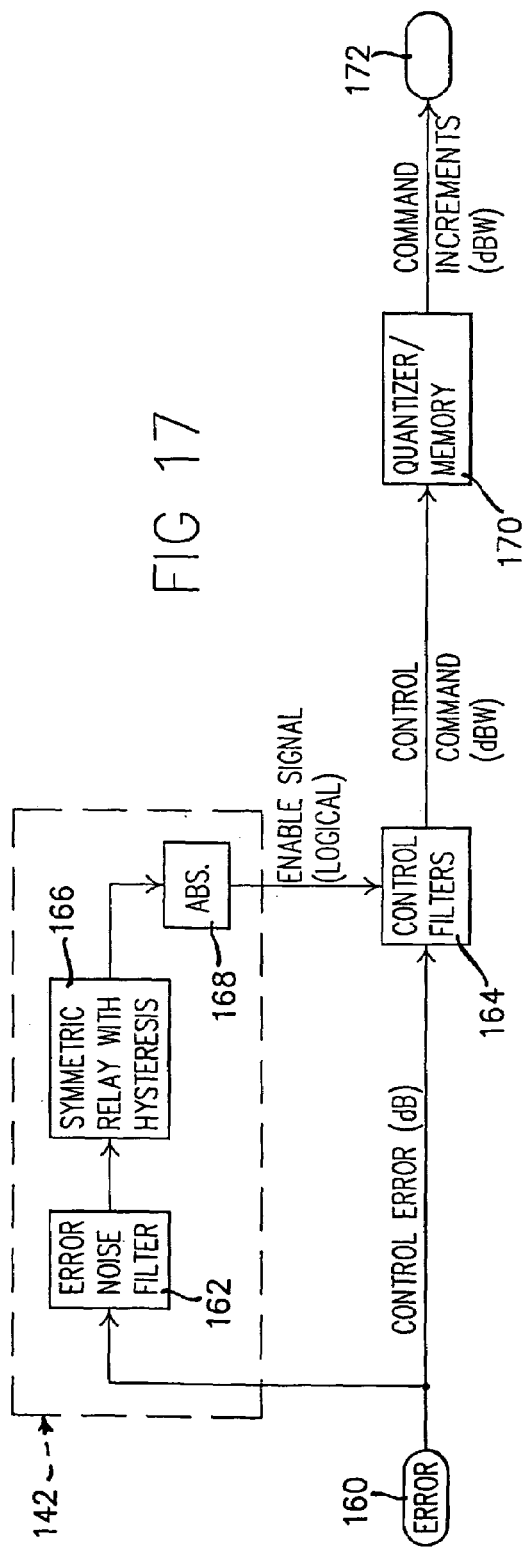
FIG. 17 is a block diagram of the ground loop controller portion of the return link power controller of FIG. 15.

Referring now to FIG. 17, the slow loop ground controller 142 of FIG. 15 will be described in greater detail. Referring initially to block 160, this block is contained in software in the data center 155. It receives the input error signal from the summing component 138 (FIG. 15) and generates an output signal in accordance therewith.

The output from block 160 is input to an error noise filter 162 and also to a control filter system 164. Block 162 is contained in the software in the data center 155. Block 162 filters its input to reduce the effects of noise. It comprises a discrete first order low-pass filter with a sampling rate of preferably 10 Hz. The output of block 162 represents a filtered version of its input.

The output from the error noise filter 162 is input into a symmetric relay with hysteresis 166. Block 166 is also contained in the software associated with the computers used in the data center 155. Block 166 outputs either a "1", "0", or "−1", depending on the history of the input. If the input is greater than some given value (or less than the negative of this value), then the output is 1 (or −1). If the input is less than another given value (or greater than the negative of this value), then the output is 0. If the input is between these two values, the output is whatever the previous output was. The values used in block 162 are capable of being modified if needed to effect fine tuning of the RLPC system 130. Block 166 is used to test if the output of the filtered error from block 162 is too large (in either the positive or negative direction). If so, a non-zero value is output, which will indicate to the rest of the RLPC system 130 that power corrections are required.

Block 168 is contained in software on the ground. The output of block 168 is the absolute value of its input, which is either "1", "0" or "−1". This is done so that the final output of the three blocks 162, 166 and 168 is either "1" or "0". A "1" indicates too large of an error. A "0" indicates the error is currently acceptable.

The control filters block 164 is also contained in software on the ground and also represents an important subsystem of the invention. The control filters block 164 is shown in detail in FIG. 18, and will be discussed momentarily. Essentially, however, the function of this block 164 is to compute the required power correction once the error has been determined to be too large. The output is a power correction command to be sent to the aircraft 12.

Block 170, which is optional, functions to create command increments from absolute commands, and is also contained in software of the data center 155 computers. Block 172 performs the identical function of block 158 of FIG. 16. This block 172 is also optional for the slow loop ground controller 142.

Block 172 receives the output from block 172 (or from block 164 if block 170 is omitted). Block 172 is also contained in software associated with computers of the data center 155. It outputs its input into the ARTS 134 in FIG. 15. In the actual implementation, the transmission of the correction command will likely proceed through several intervening elements prior to going out to the satellite transponder and back to the aircraft 12, which is the primary source of any time delay experienced in transmitting the correction command. These intervening elements are not part of the invention. They will be elements typically associated with the ground computer inter-network (such as Ethernet cards, routers, switches, firewalls, etc.), as well as elements associated with the communications system 52 (such as modulators, up-converters, encoders, antennas, etc.). They all function cooperatively to route and transmit the power commands from block 172 to the ARTS 134. Therefore, block 172 is simply an interface to all the rest of these intervening elements, and its details are hidden within the final implementation of the system 10.

Figure 18:
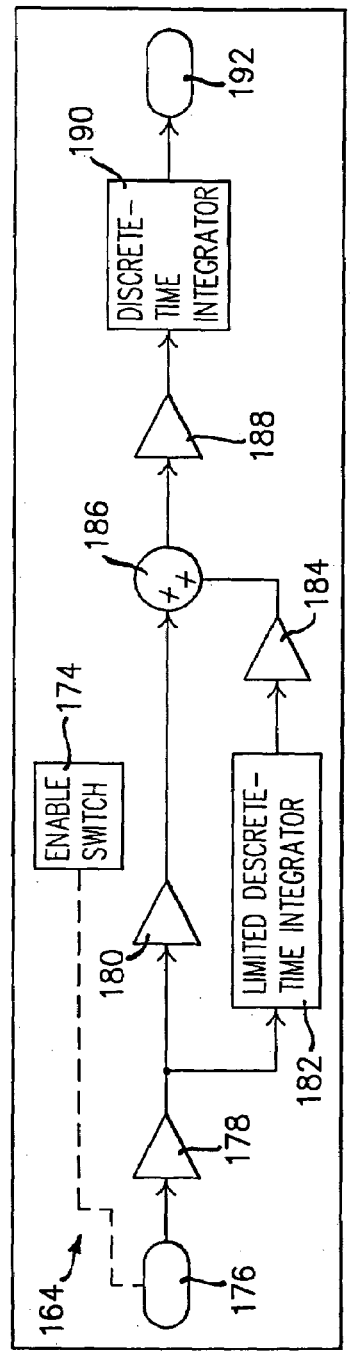
FIG. 18 is a more detailed block diagram of the components of the control filters block of FIG. 17.

Referring now to FIG. 18, the control filters block 164 is shown in greater detail. Essentially, this block represents a typical discrete second order filter with anti-windup and a sample period (T) equal to one second. An enable switch 174 is contained in the software of the computers of the data center 155 and allows the control filters block 164 to be executed only when the output from the ABS block 168 (FIG. 17) is greater than or equal to one. By tracing the signal flow on this chart, it can be seen that the enable switch 174 allows execution of the control filter block 164 only when the filtered input error is too large. This is an important part of the RLPC 130 which helps to reduce the number of times a command is sent from the central controller 26a, thereby reducing the use of otherwise saleable bandwidth.

Block 176, which is optional, is also contained in the software in the central controller 26a. Block 176 functions to transmit the measurement error signal into the control filters block 164 (FIG. 17). It represents a point of reference showing where from the containing block (block 142) the signal enters the block.

The output of block 176 is input to a proportional gain amplifier 178. Amplifier 178 is also contained in software in the central controller 26. The proportional gain amplifier 178 outputs the input it receives multiplied by a given value. This value is important to the design of the RLPC system 130, although it can be changed in response to tuning needs.

A second proportional gain amplifier 180 receives the output from amplifier 178. Proportional gain amplifier 180 is also contained in software in the central controller 26a.

This amplifier 180 performs the same function as amplifier 178 but multiplies its input by a different value.

Block 182 represents a "limited discrete time integrator" which is contained in the software on the ground. Block 182 produces the time integral of its input on its output. The integration is done in discrete time fashion using the so-called "Forward Euler" method. The sample period of this integrator is one second. The integrator is limited (so-called "anti-windup") in that it stops integrating when the output goes above a given value (or below the negative of that value). It will start integrating again when the input reverses its sign, thereby reducing the output from its limited value.

Block 184 is a multiplier which is contained in software of the GRTS 143. This block performs the same function as block 178, but multiplies its input by a different value.

The outputs from multipliers 180 and 182 are fed into a summing junction 186 which sums these values and outputs the summed value to proportional gain amplifier 188. Proportional gain amplifier 188 is contained in the software of the data center 155 and performs the same function as amplifier 178, but rather multiplies its input by a different value.

Referring further to FIG. 18, a discrete time integrator 190 receives the output from proportional gain amplifier 188. Discrete time integrator 190 is contained in the software of the data center 155 computers. This integrator 190 performs the same function as integrator 182 (with the same sample time and integration method) but is not limited as block 182 is. Interface block 192 receives the output from the discrete time integrator 190. The output from block 192 is input to block 170 in FIG. 17.

The slow loop ground controller 142 implements filters instead of a well-known "dead-bang" control method, which would require very low noise and/or an extensive knowledge of various system parameters. The full loop ground controller 142 also provides strong stability and analytical tractability. It also reacts better to model uncertainties and variations that can be easily tuned on line for optimum performance. Advantageously, the slow ground loop controller 142 creates command "increments" which end up requiring less bandwidth to be utilized when transmitting these increments to the aircraft 12. The enable switch 174 further limits the generation of commands by only executing filters when the error is above a settable limit. The enable switch 174 further acts to enable or disable each and every block within block 164. The slow loop ground controller 142 further makes use of hysteresis, contained within block 166, to prevent jitter and "hunting".

The method and apparatus of the present invention thus provides a means for managing and monitoring communications from a variety of mobile RF transmitting platforms to ensure that the aggregate PSD of all of the mobile platforms does not exceed predetermined regulatory limits. It is also an important advantage of the present invention that a central controller is used to receive and monitor requests for access to the system 10 from each of the mobile systems 20 so that close control can be maintained over the on-axis and off-axis aggregate PSD. By causing each mobile system 20 to transmit with only that amount of power needed to maintain communication link closure, the efficiency of the system 10 is maximized, thus allowing a large number of mobile systems to access the system 10 without causing the aggregate PSD to exceed regulatory limits.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for managing radio frequency (RF) transmissions from an RF system of at least one mobile platform operating within a predetermined coverage region to a space-based transponder orbiting within said coverage region, in a manner to maintain a signal-to-noise ratio (Eb/No) of said RF transmissions within a predetermined range, the method comprising the steps of:

using a first control loop to monitor, by a central controller, a signal-to-noise ratio of said RF transmissions from said mobile platform that are received by said satellite transponder, and to transmit first power correction commands to said mobile platform via said satellite transponder for maintaining said signal-to-noise ratio of said RF transmissions from said mobile platform to within a predetermined range; and using a second control loop including a mobile system of said mobile platform to monitor and further adjust a power level of said RF transmissions from said mobile platform to said satellite transponder, inbetween receipt of said commands from said central controller, by transmitting second power correction commands to said mobile platform, to maintain said power level of said RF transmissions from said mobile platform at a level previously commanded by said first power correction commands, inbetween receipt of updated power correction command signals from said central controller.

2. The method of claim 1, wherein said predetermined signal-to-noise range comprises a range of about 1 dB.

3. The method of claim 1, wherein said predetermined signal-to-noise range is above a threshold signal-to-noise ratio of said central controller.

4. The method of claim 1, further comprising the step of using said central controller to determine if said RF transmission from said mobile platform remains outside of said predetermined signal-to-noise ratio for more than about one second and, if so, commanding the mobile platform to cease said RF transmissions.

5. The method of claim 1, wherein the step of monitoring by a central controller comprises monitoring by a ground-based central controller located within said coverage region.

6. A method for managing radio frequency (RF) transmissions from an RF system of at least one mobile platform operating within a predetermined coverage region to a space-based signal relaying device orbiting within said coverage region, in a manner to maintain a signal-to-noise ratio (Eb/No) of said RF transmissions within a predetermined range, the method comprising:

forming a first control loop to enable a controller to monitor and determine power level correction commands for commanding said mobile platform to adjust a power level of said RF transmissions transmitted from an antenna of said mobile platform, to thereby maintain a power spectral density (PSD) of said RF transmissions, as experienced by a receiver of said space-based signal relay device, within a predetermined limit; and forming a second control loop between said space-based signal relaying device and said mobile platform for further enabling changes to said power level of said RF transmissions from said antenna of said mobile platform to further ensure said PSD of said RF transmissions does not exceed said predetermined limit.

7. The method of claim 6, wherein forming said first control loop comprises:
using said controller to receive said RF transmissions: and
comparing said signal-to-noise ratio of said received RF transmissions with predetermined, reference signal-to-noise ratios and using said comparison to generate commands sent by said controller to said space-based transponder to extrapolate said PSD of said RF signal transmitted from said antenna from said signal-to-noise ratio of said RF transmissions.

8. The method of claim 6, wherein said second control loop enables said mobile platform to make changes to a power level of signals transmitted from said mobile platform in between receipt of said power level correction commands from said central controller.

9. A method for managing radio frequency (RF) transmissions from an RF system of at least one mobile platform operating within a predetermined coverage region to a space-based transponder orbiting within said coverage region, in a manner to maintain a signal-to-noise ratio (Eb/No) of said RF transmissions within a predetermined range, the method comprising:
using a controller to form a first power level control loop for monitoring a power level of RF signals relayed by said space-based transponder, from said mobile platform, to said controller, for controlling a power level of said RF signals being transmitted by said mobile platform;
using said controller to generate first power level commands and transmitting said first power level commands to said space-based transponder for subsequent relay back to said mobile platform, for enabling said power level of said RF signals to be adjusted by said mobile platform; and
forming a second power level control loop between said mobile platform and said space-based transponder, wherein said mobile platform is able to implement second power level commands to said RF signals being transmitted from its said RF system independently of, and in between, said receipt of said first power level commands from said controller, to further control said power level of said RF signals being transmitted by said mobile platform.

10. The method of claim 9, wherein said controller further monitors an aggregate power spectral density (PSD) of signals received from a plurality of said mobile platforms operating within said predetermined coverage region to ensure that said aggregate PSD does not exceed a predetermined maximum value.

11. A method for managing radio frequency (RF) transmissions from an RF system of at least one mobile platform operating within a predetermined coverage region to a space-based transponder orbiting within said coverage region, in a manner to maintain a signal-to-noise ratio (Eb/No) of said RF transmissions within a predetermined range, the method comprising:
using a controller to form a first power level control loop for monitoring a power level of said RF transmissions being relayed by said space-based transponder from said mobile platform to said controller;
using said controller to generate first power level commands and transmitting said first power level commands to said space-based transponder for subsequent relay back to said mobile platform for use by said mobile platform in adjusting a power level of said RF signals; and
forming a second power level control loop between said mobile platform and said space-based transponder, independent of said first power level control loop, for enabling said mobile platform to monitor a power level of said RF transmissions transmitted from said mobile platform.

* * * * *